(12) United States Patent
Sercel et al.

(10) Patent No.: US 12,467,421 B2
(45) Date of Patent: Nov. 11, 2025

(54) OMNIVOROUS SOLAR THERMAL THRUSTER, COOLING SYSTEMS, AND THERMAL ENERGY TRANSFER IN ROCKETS

(71) Applicant: Trans Astronautica Corporation, Lake View Terrace, CA (US)

(72) Inventors: Joel C. Sercel, Lake View Terrace, CA (US); Philip J. Wahl, Altadena, CA (US); Conrad T. Jensen, Altadena, CA (US); James G. Small, Sonoita, AZ (US); Benjamin G. Workinger, Chattanooga, TN (US); Samuel Daugherty-Saunders, Claremont, CA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 18/749,428

(22) Filed: Jun. 20, 2024

(65) Prior Publication Data
US 2025/0052211 A1    Feb. 13, 2025

Related U.S. Application Data

(63) Continuation of application No. 17/813,312, filed on Jul. 18, 2022, now Pat. No. 12,025,078, which is a
(Continued)

(51) Int. Cl.
*F02K 9/64* (2006.01)
*B64G 1/40* (2006.01)
(Continued)

(52) U.S. Cl.
CPC .............. *F02K 9/64* (2013.01); *B64G 1/401* (2013.01); *B64G 1/402* (2013.01); *B64G 1/446* (2013.01);
(Continued)

(58) Field of Classification Search
CPC ........ B64G 1/401; B64G 1/409; B64G 1/446; F02K 9/42; F02K 9/44; F02K 9/60;
(Continued)

(56) References Cited

U.S. PATENT DOCUMENTS

| 1,964,189 A | 6/1934 | Koomans |
| 2,930,187 A | 3/1960 | Chillson |

(Continued)

FOREIGN PATENT DOCUMENTS

| AU | 2007200666 A1 | 8/2007 |
| CN | 103075816 | 5/2013 |

(Continued)

OTHER PUBLICATIONS

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.
(Continued)

*Primary Examiner* — Kyle Robert Thomas
(74) *Attorney, Agent, or Firm* — Knobbe, Martens, Olson & Bear, LLP

(57) ABSTRACT

Omnivorous solar thermal thrusters and adjustable cooling structures are disclosed. In one aspect, a solar thermal rocket engine includes a solar thermal thruster configured to receive solar energy and one or more propellants, and heat the one or more propellants using the solar energy to generate thrust. The solar thermal thruster is further configured to use a plurality of different propellant types, either singly or in combination simultaneously. The solar thermal thruster is further configured to use the one or more propellants in both liquid and gaseous states. Related structures can include valves and variable-geometry cooling channels in thermal contact with a thruster wall.

16 Claims, 25 Drawing Sheets

Related U.S. Application Data continuation of application No. 17/240,750, filed on Apr. 26, 2021, now Pat. No. 11,391,246.

(60) Provisional application No. 63/160,578, filed on Mar. 12, 2021, provisional application No. 63/159,957, filed on Mar. 11, 2021, provisional application No. 63/055,231, filed on Jul. 22, 2020, provisional application No. 63/016,186, filed on Apr. 27, 2020.

(51) Int. Cl.
*B64G 1/44* (2006.01)
*F02K 9/42* (2006.01)
*F02K 9/44* (2006.01)
*F02K 9/60* (2006.01)
*F03H 99/00* (2009.01)
*F24S 20/20* (2018.01)
*F24S 23/30* (2018.01)
*F24S 23/70* (2018.01)
*F24S 70/16* (2018.01)

(52) U.S. Cl.
CPC ............... *F02K 9/42* (2013.01); *F02K 9/44* (2013.01); *F02K 9/60* (2013.01); *F03H 99/00* (2013.01); *F24S 20/20* (2018.05); *F24S 23/30* (2018.05); *F24S 23/70* (2018.05); *F24S 70/16* (2018.05); *F24S 2023/832* (2018.05)

(58) Field of Classification Search
CPC .... F02K 9/64; F02K 9/68; F02K 9/972; F24S 20/20; F24S 23/30; F24S 23/70; F24S 70/16

See application file for complete search history.

(56) References Cited

U.S. PATENT DOCUMENTS

| | | |
|---|---|---|
| 2,945,234 A | 7/1960 | Driscoll |
| 2,975,592 A | 3/1961 | Fox |
| 2,990,836 A | 7/1961 | Bird |
| 2,991,617 A | 7/1961 | Nerad |
| 3,063,521 A | 11/1962 | Fuller |
| 3,064,418 A | 11/1962 | Sanders |
| 3,202,998 A | 8/1965 | Hoffman |
| 3,564,253 A | 2/1971 | Buckingham |
| 3,597,923 A | 8/1971 | Simon |
| 3,606,211 A | 9/1971 | Roersch et al. |
| 4,013,885 A | 3/1977 | Blitz |
| 4,073,138 A | 2/1978 | Beichel |
| 4,122,239 A | 10/1978 | Riboulet |
| 4,135,489 A | 1/1979 | Jarvinen |
| 4,263,895 A | 4/1981 | Colao |
| 4,286,581 A | 9/1981 | Atkinson, Jr. |
| 4,449,514 A | 5/1984 | Selcuk |
| 4,459,972 A | 7/1984 | Moore |
| 4,480,677 A | 11/1984 | Henson et al. |
| 4,528,978 A | 7/1985 | Robinson |
| 4,564,275 A | 1/1986 | Stone |
| 4,771,599 A | 9/1988 | Brown |
| 4,771,600 A | 9/1988 | Limerick |
| 4,781,018 A | 11/1988 | Shoji |
| 4,815,443 A | 3/1989 | Vrolyk |
| 4,932,910 A | 6/1990 | Hayday |
| 5,014,131 A | 5/1991 | Reed et al. |
| 5,047,654 A | 9/1991 | Newman |
| 5,104,211 A | 4/1992 | Schumacher et al. |
| 5,114,101 A | 5/1992 | Stern et al. |
| 5,138,832 A | 8/1992 | Pande |
| 5,198,607 A | 3/1993 | Livingston |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,578,140 A | 11/1996 | Yogev |
| 5,593,549 A | 1/1997 | Stirbl et al. |
| 5,674,794 A | 10/1997 | Chatterjee |
| 5,751,895 A | 5/1998 | Bridges |
| 5,861,947 A | 1/1999 | Neumann |
| 5,979,438 A | 11/1999 | Nakamura |
| 5,982,481 A | 11/1999 | Stone |
| 6,052,987 A | 4/2000 | Dressler |
| 6,057,505 A | 5/2000 | Ortabasi |
| 6,193,193 B1 | 2/2001 | Sorrano |
| 6,290,185 B1 | 9/2001 | DeMars |
| 6,343,464 B1 | 2/2002 | Westerman |
| 6,350,973 B2 | 2/2002 | Wroe |
| 6,532,953 B1 | 3/2003 | Blackmon |
| 6,594,984 B1 * | 7/2003 | Kudija, Jr. ............... F24S 50/20 60/203.1 |
| 6,669,148 B2 | 12/2003 | Anderman et al. |
| 6,742,325 B2 | 6/2004 | Kudija, Jr. |
| 7,207,327 B2 | 4/2007 | Litwin |
| 7,387,279 B2 | 6/2008 | Anderman et al. |
| 7,575,200 B2 | 8/2009 | Behrens et al. |
| 7,594,530 B1 | 9/2009 | Tucker |
| 7,823,837 B2 | 11/2010 | Behrens et al. |
| 7,997,510 B2 | 8/2011 | Pavia et al. |
| 8,033,110 B2 | 10/2011 | Gilon et al. |
| 8,147,076 B2 | 4/2012 | Ezawa |
| 8,357,884 B1 | 1/2013 | Ethridge |
| 8,379,310 B2 | 2/2013 | Mori et al. |
| 8,733,706 B1 | 5/2014 | Fernandez |
| 9,010,317 B1 | 4/2015 | Gross |
| 9,187,191 B1 | 11/2015 | Jensen et al. |
| 9,222,702 B2 | 12/2015 | Goldberg |
| 9,266,627 B1 | 2/2016 | Anderson |
| 9,346,563 B1 | 5/2016 | Martin |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 | 7/2017 | Corrigan |
| 9,771,897 B2 | 9/2017 | Soulier |
| 10,654,596 B1 | 5/2020 | Eller |
| 10,919,227 B2 | 2/2021 | Cook |
| 10,989,443 B1 | 4/2021 | Sercel et al. |
| 11,085,669 B2 | 8/2021 | Sercel |
| 11,143,026 B2 | 10/2021 | Sercel et al. |
| 11,280,194 B2 | 3/2022 | Sercel |
| 11,292,620 B1 | 4/2022 | Molony |
| 11,391,246 B2 | 7/2022 | Sercel et al. |
| 11,566,521 B2 | 1/2023 | Sercel |
| 11,598,581 B2 | 3/2023 | Small |
| 11,608,196 B2 | 3/2023 | Sercel et al. |
| 11,643,930 B2 | 5/2023 | Sercel |
| 11,702,857 B2 | 7/2023 | Sercel |
| 11,725,513 B2 | 8/2023 | Sercel et al. |
| 12,025,006 B2 | 7/2024 | Sercel |
| 12,025,078 B2 | 7/2024 | Sercel |
| 12,173,934 B2 | 12/2024 | Sercel et al. |
| 12,203,371 B2 | 1/2025 | Sercel |
| 12,215,926 B2 | 2/2025 | Small |
| 12,297,792 B2 | 5/2025 | Sercel |
| 12,298,042 B2 | 5/2025 | Sercel |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0173469 A1 | 9/2003 | Kudija et al. |
| 2003/0224082 A1 | 12/2003 | Akopyan |
| 2004/0004184 A1 | 1/2004 | Schubert |
| 2004/0231716 A1 | 11/2004 | Litwin |
| 2006/0191916 A1 | 8/2006 | Stephan et al. |
| 2007/0128582 A1 | 6/2007 | Anderson et al. |
| 2008/0000232 A1 | 1/2008 | Rogers et al. |
| 2008/0023060 A1 | 1/2008 | Grumazescu |
| 2008/0134667 A1 | 6/2008 | Pavia et al. |
| 2008/0156315 A1 | 7/2008 | Yangpichit |
| 2009/0293448 A1 | 12/2009 | Grote et al. |
| 2010/0038491 A1 | 2/2010 | Cepollina et al. |
| 2010/0163683 A1 | 7/2010 | Quine |
| 2010/0252024 A1 | 10/2010 | Convery |
| 2010/0269817 A1 | 10/2010 | Kelly |

(56) References Cited

U.S. PATENT DOCUMENTS

| | | |
|---|---|---|
| 2010/0294261 A1 | 11/2010 | Deforge |
| 2010/0319678 A1 | 12/2010 | Maemura et al. |
| 2011/0031238 A1 | 2/2011 | Segawa |
| 2011/0041894 A1 | 2/2011 | Liao |
| 2011/0127382 A1 | 6/2011 | Im |
| 2011/0185728 A1 | 8/2011 | Meyers et al. |
| 2011/0220091 A1 | 9/2011 | Kroyzer |
| 2011/0315678 A1 | 12/2011 | Furuya |
| 2012/0155966 A1 | 6/2012 | Zillmer |
| 2013/0021471 A1 | 1/2013 | Waterhouse |
| 2013/0206209 A1 | 8/2013 | Lasich |
| 2013/0239952 A1 | 9/2013 | Kroyzer |
| 2014/0138952 A1 | 5/2014 | Marumoto |
| 2014/0150651 A1 | 6/2014 | Velasco Valcke |
| 2014/0151502 A1 | 6/2014 | Kosheleff |
| 2014/0174430 A1 | 6/2014 | Fitzgerald et al. |
| 2014/0261391 A1 | 9/2014 | Taylor |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 | 1/2016 | Ethridge |
| 2016/0075453 A1 | 3/2016 | Sauzay et al. |
| 2016/0076792 A1 | 3/2016 | Magaldi |
| 2016/0121395 A1 | 5/2016 | Kawanaka |
| 2017/0129579 A1 | 5/2017 | De Jong |
| 2018/0194626 A1 | 7/2018 | Berggren et al. |
| 2018/0238272 A1 | 8/2018 | Renaud |
| 2018/0265196 A1 | 9/2018 | Phillips |
| 2018/0265224 A1 | 9/2018 | Foulds et al. |
| 2018/0298846 A1* | 10/2018 | Anflo ............... F02K 9/42 |
| 2019/0217968 A1 | 7/2019 | Schmidt |
| 2019/0271228 A1 | 9/2019 | Sowers, Jr. et al. |
| 2019/0358570 A1 | 11/2019 | Kiefer |
| 2020/0055617 A1 | 2/2020 | Grover |
| 2020/0283174 A1* | 9/2020 | Kokorich ............... B64G 1/402 |
| 2021/0061494 A1 | 3/2021 | Belieres Montero |
| 2021/0197987 A1 | 7/2021 | Kokorich et al. |
| 2021/0333019 A1 | 10/2021 | Sercel et al. |
| 2022/0024612 A1 | 1/2022 | Sercel et al. |
| 2022/0089302 A1 | 3/2022 | Sercel et al. |
| 2022/0290635 A1 | 9/2022 | Sercel |
| 2023/0249848 A1 | 8/2023 | Sercel |
| 2023/0280098 A1 | 9/2023 | Small |
| 2023/0383650 A1 | 11/2023 | Sercel |
| 2023/0399946 A1 | 12/2023 | Sercel |
| 2024/0159076 A1 | 5/2024 | Sercel |
| 2024/0254010 A1 | 8/2024 | Kamen |
| 2024/0300677 A1 | 9/2024 | Sercel |
| 2025/0092785 A1 | 3/2025 | Sercel |

FOREIGN PATENT DOCUMENTS

| | | |
|---|---|---|
| DE | 10350734 | 3/2005 |
| DE | 102004026517 B3 | 10/2005 |
| EP | 2 177 846 | 4/2010 |
| EP | 2 195 583 | 3/2013 |
| ES | 2639583 | 10/2017 |
| GB | 1481234 | 7/1977 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |

OTHER PUBLICATIONS

Antenna-theory.com, 2015, https://antenna-theory.com/antennas/dipole.php 7/7, The dipole antenna, accessed Aug. 10, 2023.

Antenna-theory.com, 2015, https://www.antenna-theory.com/tutorial/txline/transmissionline.php, Introduction to transmission lines, accessed Aug. 10, 2023.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions on Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue-moon-lunar-lander/.

Boyle, A., "Jeff Bezos lays out his vision for city on the moon, complete with robots", May 20, 2017,https://www.geekwire.com/2017/jeff-bezos-blue-origin-moon/.

Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

Ceruti, Conceptual Design and Preliminary Structural Analysis of Inflatable Basket for an Asteroid Capturing Satellite; Strojniki vestnik - Journal of Mechanical Engineering 61(2015)5, 341-351 Received for review: Jul. 17, 2014; © 2015 Journal of Mechanical Engineering; DOI:10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA SPACE and Astronautics Forum and Exposition, 2018, in 13 pages.

Cohen, Marc M., et al., "Asteroid Mining," AIAA 2013-5304, presented at AIAA SPACE 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2):137-167, 2015.

Crusan, J., "an Evolvable Mars Campaign" NASA Presentation, Jul. 2014, available at https://www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Eldred, et al., "Alternative Scenarios Utilizing Nonterrestrial Resources", Space Resources Scenarios NASA, 1992.

(56) References Cited

OTHER PUBLICATIONS

Erickson, K., "Optimal Architecture for an Asteroid Mining Mission: Equipment Details and|Integration" Collection of Technical Papers—Space Conference 2006, Sep. 19-21, 2006, San Jose, California; AIAA 2006-7504; in 17 pages.

Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008-215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al, "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al., "Near Earth Resources," In Near Earth Objects, Annals of the New York Academy of Science, vol. 822, p. 468-510, 1997.

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), pp. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

GRIP; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

Grossman, G., et al., "Inflatable Concentrators for Solar Propulsion and Dynamic Space Power." Journal of Solar Energy Engineering, Nov. 1990, vol. 112/229.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P. O., et al., "Diviner Lunar Radiometer Observations of the LCROSS Impact", Science 330, 2010, pp. 477.

Heiken, G.H., et al., "Lunar sourcebook-a user's guide to the moon". NASA,. Cambridge, England, Cambridge University Press, 1991, vol. 753, pp.

Interbartolo III. Michael A, et al., "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect US from Earth Impactors." Planetary Defense Conference 2013, pp. 3, 5 [online] <URL: http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi:10.1016/j.icarus. 2010.10.030.

Mommert, M., et al., "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Spaceflight, http://images.spaceref.com/docs/ 2014/Emerging_Space_Report.pdf.

NASA, "Asteroid Redirect Mission Reference Concept," 2013.

Norton, B., "Harnessing Solar Heat," Springer, pp. C1-xiii, 39 and 48-73, ISBN 978-007-7275-5, 2013.

Pike R.J., "Crater dimensions from Apollo data and supplemental sources". The Moon, 1976, vol. 15, pp. 463-477.

(56) References Cited

OTHER PUBLICATIONS

Pike, R.J., "Depth/diameter relations of fresh lunar craters: Revision from spacecraft data", Geophysical Research Letters, 1974, vol. 1(7), pp. 291-294.
Rapp, D., "Use of Extraterrestrial Resources for Human Space Missions to Moon or Mars (Springer Praxis Books / Astronautical Engineering)" published Nov. 20, 2012.
Reinhold; A Solar Powered Station at a Lunar Pole; Feb. 18, 2021; https://theworld.com/~reinhold/lunarpolar.html; 7 pages.
Rimoli, J.J., et al., "Mechanical response of 3-dimensional tensegrity lattices", Composites Part B: Engineering, 2017, vol. 115, pp. 30-42.
Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.
Rostami, J., et al., "Lunar tunnel boring machines", In Earth and Space 2018: Engineering for Extreme Environments, American Society of Civil Engineers, pp. 240-252, 2018, Reston, VA.
Sabelhaus, A.P., et al. "Model-predictive control of a flexible spine robot", American Control Conference, 2017, IEEE, pp. 5051-5057.
Sanders, Oct. 10, 2019, NASA Lunar ISRU Strategy, presented at the What Next for Space Resource Utilization? Workshop, Luxembourg, 20 pp.
Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" For Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1_.01-9278.html>.
Sercel, Apr. 22, 2015, Worker Bees: thin-film solar thermal technology enables water-based cis-lunar transportation architecture, ICS Associates Inc., 109 pp.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel; Time Dependent Finite Difference Modeling of Outgassing of Asteroids via Bulk Heating; 978-1-5386-2014-4/18/$31.00 @2018 IEEE; l 14 pages.
Shao, M.B., et al., "Finding very Small Near-Earth Asteroids using Synthetic Tracking," Astrophysics .J782:1, 2014, arXiv, 1309.3248.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, AIAA Space Programs and Technologies Conference, Mar. 1992.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the Iro mini-rf imaging radar", Journal of Geophysical Research: Planets, 2013, vol. 118(10), pp. 2016-2029.

Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stewart et al., Sep. 1996, Dual fuel solar thermal stage—ideal analysis, Journal of Spacecraft and Rockets, 33(5):752-754.
Stoica, A. et al., "TransFormers of Extreme Environments and Their Integration in a Solar Power Infrastructure". AIAA SPACE 2016, AIAA SPACE Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al, "Deployment of tensegrity structures", International Journal of Solids and Structures, 2003, vol. 40(18), pp. 4637-4657.
Sunspiral, V., et al, "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Ulas et al., 2013, Numerical analysis of regenerative cooling in liquid propellant rocket engines, Aerospace Science and Technology 24(1):187-197.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al, "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; Aiaa Space 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. August 30-Sep. 2, 2010, Anaheim, CA, AIAA 2010-8638.
International Search Report/Written Opinion; Jan. 30, 2020; International Application No. PCT/US2019/045526; Filed Aug. 7, 2019; in 9 pages.
International search report and written opinion dated Oct. 27, 2018 in application No. PCT/US2016/29072.
Extended Search Report dated Oct. 24, 2018; International Application No. EP16784044.6; filed Dec. 10, 2019.
International Search Report and Written Opinion received in PCT/US2021/029205 dated Mar. 1, 2022.
Bradford et al., Jul. 9, 2001, Fresnel concentrators for space solar power and solar thermal propulsion: final report, United Applied Technologies, Inc., 22 pp.
Thangavelu et al., Sep. 13-16, 2016, PocketPad™: Concept for an Expendable Safe Lander Touchdown Accessory, AIAA Space Forum, 5355, 9 pp.

* cited by examiner

OMNIVOROUS SOLAR THERMAL THRUSTER, COOLING SYSTEMS, AND THERMAL ENERGY TRANSFER IN ROCKETS

INCORPORATION BY REFERENCE TO ANY PRIORITY APPLICATIONS

This application is a continuation of U.S. patent application Ser. No. 17/813,312, filed on Jul. 18, 2022, which is a continuation of U.S. patent application Ser. No. 17/240,750 filed on Apr. 26, 2021, now issued as U.S. Pat. No. 11,391, 246, which is based upon and claims the benefit of priority from: U.S. Provisional Patent App. No. 63/016,186 filed on Apr. 27, 2020; and from U.S. Provisional Patent App. No. 63/159,957 filed on Mar. 11, 2021; and from U.S. Provisional Patent App. No. 63/160,578 filed on Mar. 12, 2021; and from U.S. Provisional Patent App. No. 63/055,231 filed on Jul. 22, 2020. Moreover, Any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

The present disclosure relates to versatile rocket propulsion systems. For example, disclosed solar thermal rocket propulsion systems can operate over a range of conditions and/or use a range of different propellants.

Related Technology

Related technology includes solar thermal rockets, which use solar energy to heat propellants in a rocket chamber.

SUMMARY

A rocket engine (e.g., a solar thermal engine) can be provided, comprising: a thruster (e.g., a solar thermal thruster). The thruster can be configured to: receive energy (e.g., solar energy) and one or more propellants, and heat the one or more propellants using the (e.g., solar) energy to generate thrust, wherein the thruster is further configured to adapt for a plurality of different propellant types, either singly or in combination simultaneously, and wherein the thruster is further configured to use one or more of the propellant types in both liquid and gaseous states.

The thruster can comprise: one or more regenerative channels configured to direct flow of and simultaneously change thermal energy of the one or more propellants.

The engine can be further configured to adjust a length and/or cross sectional area of the regenerative channels.

Each of the regenerative channels can have a fixed total length and can comprise a plurality of inlet ports arranged along that length, and the engine can further comprise a plurality of inlet valves associated with the inlet ports and configured to selectively inject the one or more propellants into the regenerative channels via selected inlet ports such that a deployed length of the regenerative channels is adjustable.

Each of the regenerative channels can have a fixed total length, include a plurality of inlet ports, and the engine can further comprise a plurality of inlet valves configured to block, permit, or change flow of the one or more propellants into the inlet ports, thereby adjusting a flow of the one or more propellants through the regenerative channels.

The solar thermal thruster can comprise a pressure chamber and an exhaust cone, the pressure chamber connected to and axially aligned with the exhaust cone; and the regenerative channels can follow a helical path around or through a surface of at least one of the pressure chamber and the exhaust cone.

The engine can further comprise: one or more electric thermal elements configured to adjust a temperature of the solar thermal thruster; one or more heat exchangers; and one or more valves to admit the one or more propellants into the heat exchangers and adjust flows of the one or more propellants to accommodate changing thermodynamic characteristics during different phases of rocket operations including startup, shutdown, and continuous operation at variable thrust levels.

The solar thermal thruster can comprise: a solar absorbing structure comprising an assembly of partially reflecting, partially transmitting, and partially absorbing surfaces, thereby converting solar energy into thermal energy within the surfaces, and a transparent pressure-resistant window configured to transmit the solar energy into the solar absorbing structure and contain the gases within the chamber.

The solar absorbing structure can be further configured to contain the one or more propellants in spaces between the surfaces such that the thermal heat energy is transferred to the one or more propellants via both thermal radiation and fluid conduction from the surfaces.

The solar absorbing structure of surfaces can be formed of one or more of the following materials: metallic alloys and ceramics.

The solar absorbing structure can comprise a plurality of reflecting and absorbing passages having triangular, rectangular, hexagonal, octagonal, or circular cross-sections, the reflecting and absorbing passages can be further configured to provide a volume over which the solar energy is absorbed simultaneously with providing a surface area and shape of a surface over which the propellant flows to absorb heat from the solar absorber structure.

The solar absorber can further comprise a multi-surface light trapping solar absorber comprising a honeycomb lattice, a bundle of thin walled tubes, or a coil of thin sheets.

The solar thermal thruster can further comprise one or more peripheral cooling channels, and the thruster adapts for different propellant types by using at least one valve to adjust a deployed length of at least one cooling channel, thereby adjusting a cooling effect in the thruster.

The engine can further comprise: a solar collector configured to collect and redirect the solar energy; a solar absorber configured to absorb at least a portion of the solar energy; and an adjustable solar flux modulator disposed between the solar collector and the solar absorber, the modulator configured to adjust thermal power input to the solar thermal thruster.

The solar flux modulator can comprise one or more of a variable geometry aperture, a shuttered opening, one or more blinds, and an opening at least partially covered with a material having variable optical transmissivity.

The engine can further comprise: a store of cleaning propellant, wherein the solar thermal thruster can be further configured to periodically use the cleaning propellant to clean an inside surface of the solar thermal thruster and remove deposits made through the operation of the solar thermal thruster when using the one or more propellants.

The solar thermal thruster can be further configured to operate with different combinations of depositing propellants and cleaning propellants.

The window in the thruster can be configured as a lens to further concentrate the sunlight into the thruster so as to increase the peak temperature inside the thruster and increase the performance of the thruster.

An adjustable jacket cooling system can be provided for a rocket engine. The system can comprise: a combustion chamber having a strong peripheral wall and configured to contain propellant; a converging/diverging rocket nozzle at one end of the combustion chamber and configured to expel propellant to produce rocket thrust; at least one cooling channel in thermal contact with the peripheral wall; at least one intermediate opening in the cooling channel; at least one valve configured to change a deployed length of the at least one cooling channel, thereby adjusting a cooling effect for the peripheral wall.

The cooling channel and valve can be configured to use the intermediate opening to change the structural cooling capability of the rocket engine such that it can operate effectively using at least two different types of propellant (e.g., types that have significantly different thermodynamic properties).

The adjustable jacket cooling system can be adapted for use with a solar thermal rocket engine. The engine can comprise a solar thermal thruster configured to receive solar energy and one or more propellants, and heat the one or more propellants using the solar energy to generate thrust. The adjustable jacket cooling system can allow the thruster to use a plurality of different propellant types in one or both of their liquid and gaseous states.

The cooling system and engine can have at least one cooling channel that comprises a regenerative channel configured to direct flow of and simultaneously change thermal energy of the one or more propellants.

The cooling system and engine can be configured to adjust a deployed length of the one or more regenerative channels. This can allow the system to be tuned for use with propellants having different properties.

A solar concentrator can be configured to power the solar thermal rocket engine, the solar concentrator comprising: a primary reflector; and a secondary reflector, wherein the primary reflector is configured to concentrate the solar energy towards the secondary reflector, and wherein the secondary reflector is configured to reflect the solar energy into a less converging, slightly diverging, or parallel beam, the intensity of the reflected solar energy being greater than the solar energy prior to being reflected by the secondary reflector.

Two reflectors can be arranged in a Cassegrain configuration. In some embodiments, a Cassegrain configuration includes a paraboloidal primary mirror and hyperboloidal secondary mirror, can achieve similar results to those of a telephoto lens, and can have light brought to a focus through a perforation in the center of the primary mirror.

The primary reflector can comprise an orifice, and wherein the primary reflector and the secondary reflector can be oriented such that the reflected solar energy passes through the orifice in the primary reflector during normal operation prior to entering the solar thermal rocket engine.

The orifice can be positioned and configured to mitigate damaging effects of pointing errors by rejecting the reflected solar energy when incorrectly pointed.

A rocket engine system can comprise: a first propellant container configured to hold deposit-forming propellant; a second propellant container configured to hold deposit-cleaning propellant; a passage connected to both the first and second propellant containers; a manifold in fluid communication with the passage and configured to select or combine propellant from the containers; and a cleaning control system configured to control the manifold, thereby using propellants to reduce deposits within the rocket engine system.

The rocket engine system can further comprise: a third container configured to hold cooling fluid; a passage configured to direct cooling fluid through structural elements of the rocket engine; and a cooling control system configured to control the flow of the cooling fluid, thereby at least periodically cooling to maintain structural integrity of the rocket engine.

DETAILED DESCRIPTION

Examples of Rocket Propulsion Systems

Figure 1:
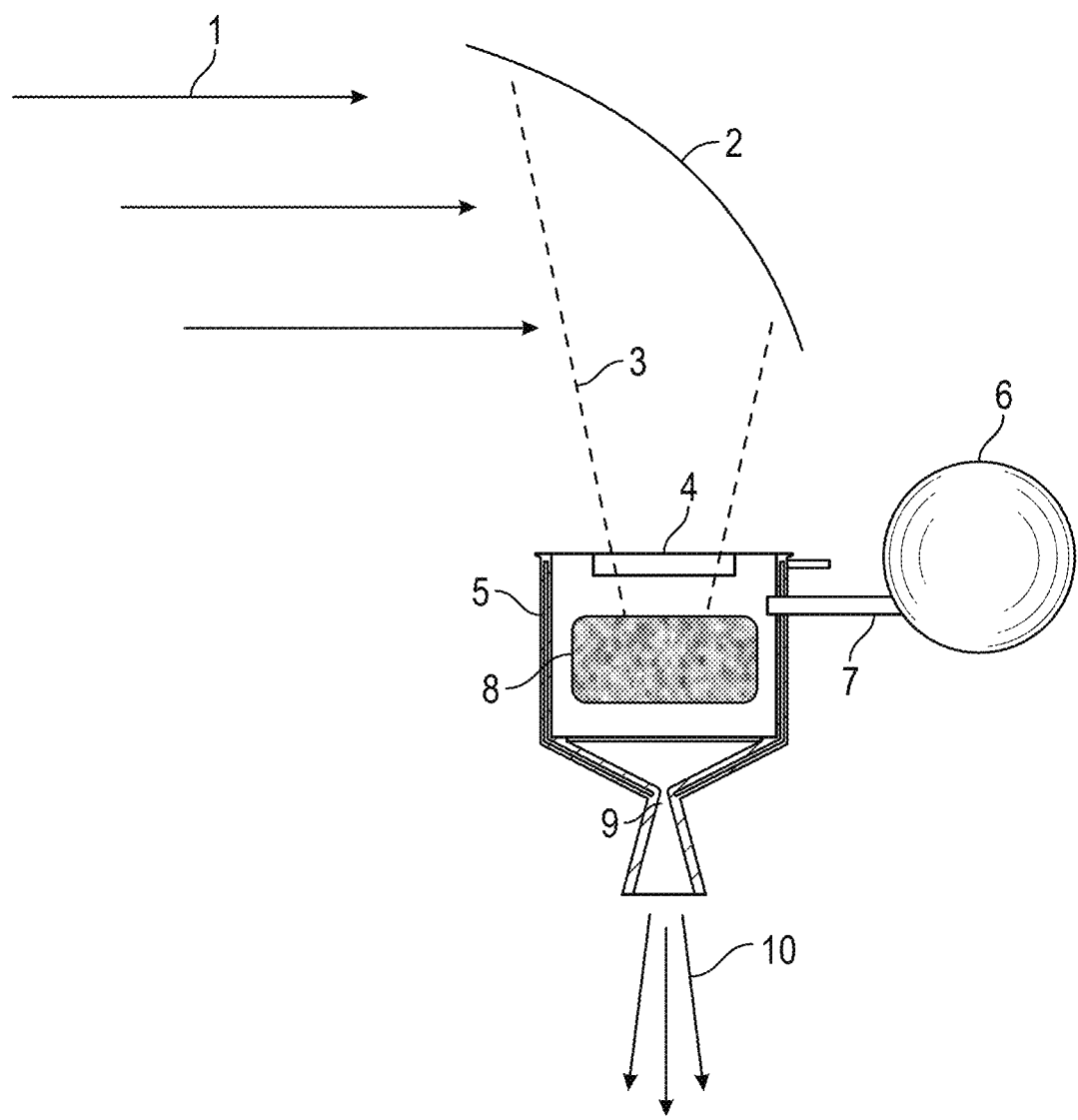
FIG. 1 illustrates a system configured to deliver concentrated solar energy and use it in a solar thermal rocket.

A rocket can include a pressurizing chamber configured to contain a propellant gas that is heated to a relatively high temperature, typically above 1,000 K. The rocket can further include a nozzle with a minimum area throat through which the hot propellant gas is configured to escape at a relatively high pressure, typically greater than 1 atm and sometimes are much as a few thousand atm, thereby providing thrust to propel the rocket forward. Aspects of this disclosure relate to improvements to one or more of these structures.

A rocket can include at least the following two features: a pressurizing chamber configured to contain a hot propellant gas, and a nozzle shaped to allow the gas to escape. The rocket is configured to pass the hot, pressurized propellant gas from the chamber through throat of the nozzle, which can be shaped to use the gas to produce thrust. For example, the nozzle may be a converging-diverging expansion nozzle which is configured to extract a flow of gas from the chamber and accelerate the flow to a relatively high velocity (typically at least 100 m/s and sometimes up to 10,000 m/s, thereby producing thrust.

When hot gas is produced by the combustion of fuel and an oxidizer, the pressurizing chamber is usually termed a combustion chamber. In this case, the propellant may be a mixture of gaseous combustion products. When propellant is heated by non-combustion means such as electrical heating, optical heating, or other directed energy heating, then the pressurizing chamber may be termed a propulsion chamber. Often the propellant is introduced into the rocket engine as a liquid and then vaporized in the engine either by the heat of the chemical combustion or other means. In some implementations, the propellant can be any working fluid, including a gas or a liquid that is used in a rocket engine.

Aspects of this disclosure relate to systems and methods configured to use concentrated solar energy to heat a propellant to a relatively high temperature and pressure. This creates a "Solar Thermal Rocket" or STR. Throughout this disclosure, all reference to STR or solar thermal rocket technology also applies to laser driven rockets. In laser driven rockets a laser is be directed toward a rocket to provide analogous energy inputs described commonly throughout this disclosure as originating from the Sun. However, the same principles, structures, and solutions apply where optical energy originates with a laser. For example, a laser may be directed at a rocket to heat propellant and provide other energy benefits.

Aspects of the present disclosure also relate to improvement of all types of liquid propelled rocket engines, including electrical resistojets and arcjets, solar, nuclear, and chemical rockets, as well as hybrids thereof, and the like. For example, all rockets that store propellant as liquid can benefit from adjustable cooling channel geometry, as described throughout this disclosure.

In aspects of the present disclosure, one or a combination of various propellant fluids may be used, including but not limited to: water, carbon dioxide, ammonia, hydrazine, or hydrogen. Propellant(s) may be stored in and introduced into the rocket engine either as gases or liquids. When introduced as liquid, the propellant is generally vaporized by the engine, either internally in the chamber or prior to injection into the engine. When liquid propellants are vaporized prior to their injection into the chamber, the device that performs this vaporization may be referred to as a vaporizer. In general, significant energy or power is provided to the vaporizer to allow the vaporizer to perform its function. In general, the physical geometry and the quantity of energy/power delivered to the vaporizer can be tailored to the propellant fluid being used as each different propellant may vaporize in a different way depending on the physical and chemical properties of the propellant.

It is anticipated that useful propellant materials will be extracted by space mining processes that are applied on asteroids, moons, and/or other planetary bodies. Thus, a solar thermal rocket that can operate using multiple alternative propellant materials is desired to enable the solar thermal rocket to use available materials as propellant gas for propulsion. Systems and methods for obtaining and using such propellant materials are described in U.S. Publication No. 2018/0051914, which is incorporated by reference herein for all that it contains.

In general, it is desirable for the temperature and pressure of gas inside the chamber of a rocket engine to be as high as possible because the speed at which the gas is ejected from the nozzle increases with increasing chamber pressure and temperature.

Heat can be "lost" from the system. For example, heat can radiate or flow away from the chamber without contributing to thrust. The usefulness of a rocket system can be increased by efficient conversion of the input thermal energy into produced thrust that avoids or minimizes such losses. It is desirable to minimize thermal energy losses by reducing thermal heat flow out of the propellant gas and through the walls of the propulsion chamber and the walls of the expansion nozzle. The heat loss problem may be increased when rocket thrusters are reduced in size. For example, smaller propulsion chambers have more surface area per total volume than similar larger chambers. Thus, decreasing chamber size can lead directly to an increase in heat radiation losses and a reduction in thermal efficiency.

It is often desirable to cool a portion (e.g., the exterior surface) of the chamber of a rocket engine to reduce the thermal stress on the materials of the engine and/or to minimize heat leakage from the engine and therefore losses from the engine to the environment. Thruster wall cooling can be accomplished by flowing relatively cool propellant through channels in the wall of the thruster. This can result in "regenerative" cooling of the chamber because the propellant can absorb heat in this process (and, for example subsequently enter a combustion chamber with greater initial energy). If heat absorption is great enough, the regenerative cooling channels also serve the purpose of vaporizing the propellant and hence the regenerative cooling components can also function as the vaporizer of the thruster.

The systems and methods described herein provide improvements to the thermal efficiency and operational flexibility of solar thermal rockets and can be applied to chambers of various sizes. Aspects of this disclosure can also simplify or otherwise improve the flow paths for propellant gasses, thereby reducing construction costs and improving operating reliability. Aspects of this disclosure also relate to changing the physical geometry of the vaporizer and the quantity of energy/power delivered to the vaporizer to improve the performance of the vaporizer and the thruster and allow the thruster to operate on alternative propellants.

The present disclosure may be applied to solar thermal rocket systems of various sizes, dimensions, and proportions, using various propellant fluids (e.g., water, hydrazine, ammonia, argon, methane, hydrogen and/or propane). Other materials (and/or the process that can produce them) are described for example in U.S. Publication No. 2018/0051914 at FIGS. 22, 23, 35, 38, 40, 41, 45, 50 and 51 (and their related descriptions). Features and advantages of the present disclosure will be apparent to those of ordinary skill in the art from the above and from the following additional description, taken together with the accompanying drawings, in which like reference numerals refer to like parts.

An Omnivore™ thruster can use various materials as propellants. There is high leverage to having a propulsion system that can use propellants that require minimal processing in space prior to use. Some embodiments can perform minimal processing to separate water from carbon dioxide and purify the water for use as a propellant. Other embodiments can avoid processing and simply use all or a combination of fluid products of an optical mining process (e.g., the processes disclosed in U.S. Publication No. 2018/0051914). The use of unprocessed fluids can be efficient and useful for obtaining propellants from asteroids, for example, because it reduces the mass and complexity of any structures and processes needed for distillation or separation of mined materials. The use of unprocessed or less processed fluids can also enhance the effective productive yield of the propellant mining process itself. For example, in some embodiments the only processing may be filtering (not distillation, for example). Filtering can help reduce the risk of large particles blocking a fluid nozzle, for example. Thus, raw, less processed (e.g., filtered only), volatile products from an optical mining process can be used to propel the solar thermal rocket.

U.S. Publication No. 2018/0051914 shows (see, e.g., FIGS. 6, 25-26, 49, 53, and 57) various configurations for STRs; these figures and all related descriptions are among the materials incorporated by reference herein.

In some example embodiments, a thruster can be formed from at least four primary parts: a thruster body (e.g., made of ceramic, metallic, or composite material), a transparent window (e.g., made of high temperature glass, fused silica, sapphire, or other transparent material) one or more clamps (e.g., Marman clamps), bonding connection, and seals to hold the window in place, and one or more ceramic foam solar absorber inserts configured to absorb the solar energy and transfer the absorbed heat to the working fluid. The thruster body may be formed using 3D printing in some implementations.

A thruster body insert can be formed from ceramic, metallic, or composite material. The thruster body insert can be configured to function as a solar absorber and/or heat exchanger. In some embodiments, the solar absorber may be formed from a ceramic foam. The ceramic materials can be selected to be compatible with both SO2 and hydrocarbon contaminants because SO2 and hydrocarbon contaminants have been found in the effluent of optical mining experiments. In certain embodiments, one of the ceramic materials used for the thruster body can be Zirconia. Zirconia ceramics can be formed into a low density foam. Zirconia has uses in the steel industry as a filter for cleaning debris from high temperature molten metals. In some embodiments, another ceramic material that can be used for the thruster body is thorium oxide. Thorium oxide may be a particularly useful material for flight applications. Thorium oxide is a relatively high temperature oxidation resistant ceramic (melting point approximately 3300 degrees Celsius) that occurs in nature. Thorium oxide can deliver specific impulse performance over 350 s with water propellant, for example, and over 800 s with hydrogen propellant. Thorium oxide is slightly radioactive and therefore better suited for use in space than in earth laboratory experiments performed by humans.

Design studies of three omnivore thrusters are further described in Appendix B to Provisional Patent Application No. 63/016,186, to which the present application claims priority (hereinafter "APIS"). These studies explore the likely performance of omnivore thrusters using mixtures of CO2 and H2O. Experiments showed that CO2 rich mixtures tend to produce higher thrust and efficiency, but lower specific impulse.

U.S. Pat. No. 4,036,012 provides additional background on STR propulsion, thruster performance potential, inflatable solar concentrators, liquid hydrogen thermal control, and propellant feed systems. U.S. Pat. No. 4,036,012 is also incorporated by reference herein for all that it contains.

FIGS. 1-4 of U.S. Pat. No. 4,036,012 show STR embodiments and improvements that can be used with the structures and methods described in U.S. Publication No. 2018/0051914, APIS, and U.S. Pat. No. 4,036,012. These non-limiting examples illustrate principles and structures that can apply to all other STR embodiments disclosed herein (and in U.S. Publication No. 2018/0051914, APIS, and U.S. Pat. No. 4,036,012).

FIG. 1 illustrates a system configured to deliver concentrated solar energy to a solar thermal rocket. The system includes one or more reflecting surfaces 2, a transparent window 4, a pressurized propulsion chamber 5, a propellant supply system 6, and an injector channel 7.

Referring to FIG. 1, solar energy 1 from the sun is reflected and concentrated by the one or more reflecting surfaces 2. In some embodiments, the one or more reflecting surfaces 2 may be curved as illustrated. The converging solar energy 3 passes through the transparent window 4 into the pressurized propulsion chamber 5. A pressurized propellant gas can be simultaneously delivered from the propellant supply system 6 through the injector channel 7 into the pressurized propulsion chamber 5.

As shown in FIG. 1, the injector channel 7 can be positioned in proximity to the window 4 to provide a degree of cooling for the window material. In some embodiments, the window 4 can be fabricated from a highly temperature tolerant material such as fused quartz or sapphire.

An STR can position a thruster at or near the focus of a solar concentrator when in use. Advanced 3D printing of high temperature ceramics (e.g., Zirconia foam) can be used to form a monolithic thruster body (e.g., in the right shape to occupy or fill a thruster chamber and having a low density closed-cell ceramic foam structure). A window (e.g., sapphire) can provide optical access to an enclosed thruster chamber. One or more propellant inlets can be located at or near the window to cool the window. The ceramic foam structure can be a solar absorber and provide a heat interchange as propellant flows through open cells of the foam structure and solar energy heats the cell walls, thereby allowing the walls to transfer heat energy to adjacent propellant in the cells. This increases the pressure in the chamber and causes flow toward the nozzle's throat. One or more (e.g., additional) propellant inlets can enter the sidewalls of the thruster body near the nozzle's throat and flow toward the top of the foam structure using annular channels that open near the window. In a process of regenerative heat capture, this fluid can absorb heat radiating from the chamber into its walls and therefore arrive in a warmer state than fluid that has not passed through these channels in the thruster body. By capturing the heat in this manner, the regenerative cooling channels increase the efficiency of the thruster by returning heat, which would otherwise be lost, to the propellant prior to its entry into the chamber. Accordingly, the channels can also be considered regenerative heating channels in the sense that they also productively pre-heat propellant. The thermal energy transfer they facilitate is thus beneficial in many complementary ways. Cooling chamber walls prolongs their life; pre-heating propellant increases thrust or makes the chamber more efficient; providing for customized or dynamic channel lengths can allow the thruster to be tuned for use with a wider variety of propellants; and the overall system wastes less energy, achieving a greater net efficiency over the longer period of time it survives. The cooling/heating channels have a synergistic effect and can make any rocket engine more durable, efficient, powerful, versatile, and productive.

In some embodiments, the window can be made of a flat transparent material. In aspects of the present disclosure, the window can be made of lens shaped transparent material convex on one or both sides such that the light is concentrated into the center of the thruster to increase peak temperature and therefore performance of the thruster.

Most common gas molecules are substantially transparent to the dominant energy wavelengths contained in sunlight. It follows that the concentrated solar energy 3 couples only weakly to most gasses. Aspects of this disclosure can overcome this potential limitation in the solar thermal process by introducing an intermediate thermal conversion step.

In certain implementations, the propulsion chamber 5 can contain a quantity of open-cell porous ceramic material 8. The ceramic material 8 may be partially transparent and partially absorbing to solar energy in its bulk structure. The ceramic material 8 can also contain a plurality of open channels through which solar energy can penetrate deeply into the structure of the ceramic material 8. The open-cell structure of the ceramic material 8 may further permit the flow of propellant gas through the ceramic material 8. The use of such a ceramic material 8 can enable concentrated solar energy to be absorbed efficiently in heating the ceramic material 8. Simultaneously, the large internal surface area of the porous ceramic material 8 can efficiently transfer heat to the propellant gas by direct conduction.

The pressurized propellant gas passes from the injector 7 through the ceramic material 8 where the propellant gas is heated to a relatively high temperature and then into the converging-diverging expansion rocket nozzle 9. As in most rockets, the nozzle 9 converts the random thermal motion of the high temperature gas into a directed high velocity flow. The nozzle 9 can extract a flow of gas from the chamber and accelerate the flow to a relatively high velocity, thereby producing efficient thrust.

It is desirable to heat the propellant gas to the maximum possible temperature achievable by the rocket. In certain embodiments, non-imaging anidolic optical systems can be used to heat the ceramic materials 8 and infuse the propellant gas within the ceramic to temperatures above 2000 K (degrees Kelvin). Such temperatures can be achieved with concentrating systems 2 having a collection area equal to or greater than 1 square meter when located at a distance from the sun substantially equivalent to the orbit of earth. Embodiments of the solar thermal rockets disclosed herein can be used throughout the inner solar system and to beyond the orbit of Mars.

Figure 2A:
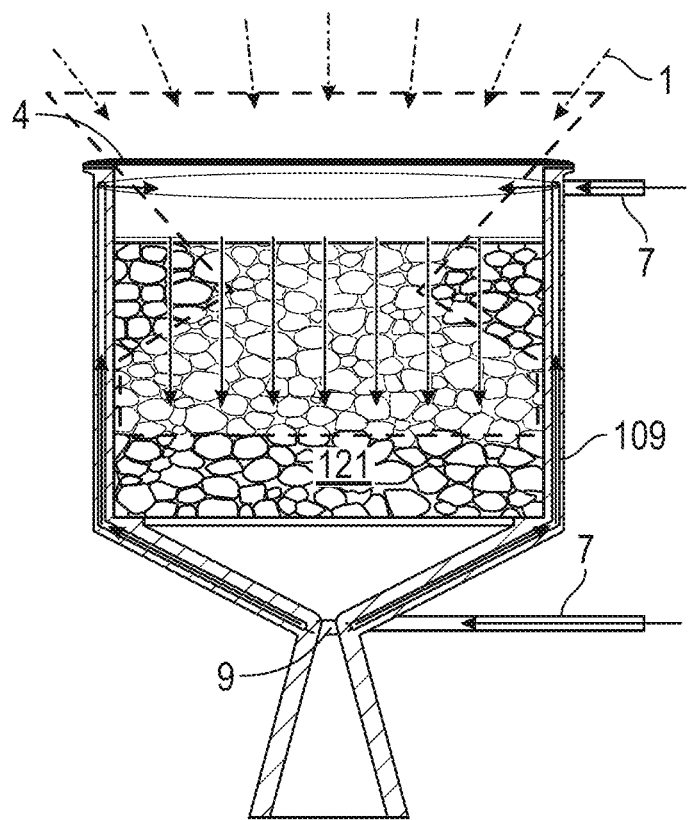
FIGS. 2A-2H show how propellant injection tubes 7 can be oriented tangentially to a generally annular thruster chamber, thereby enhancing swirl of propellant and assisting in uniform propellant distribution.
Figure 2B:
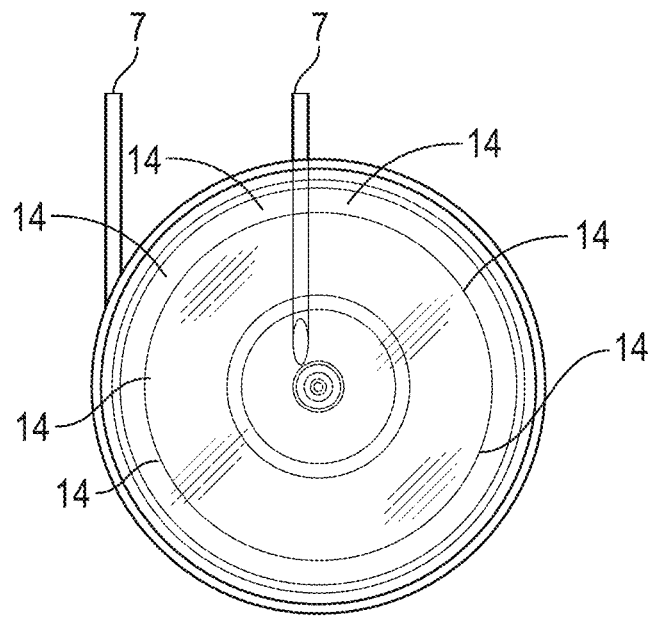
Figure 2C:
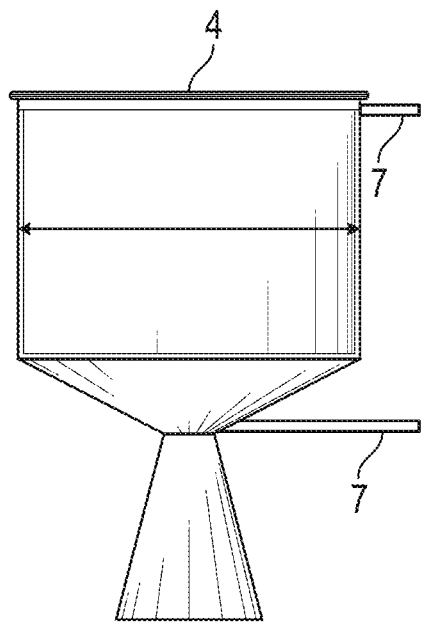
Figure 2D:
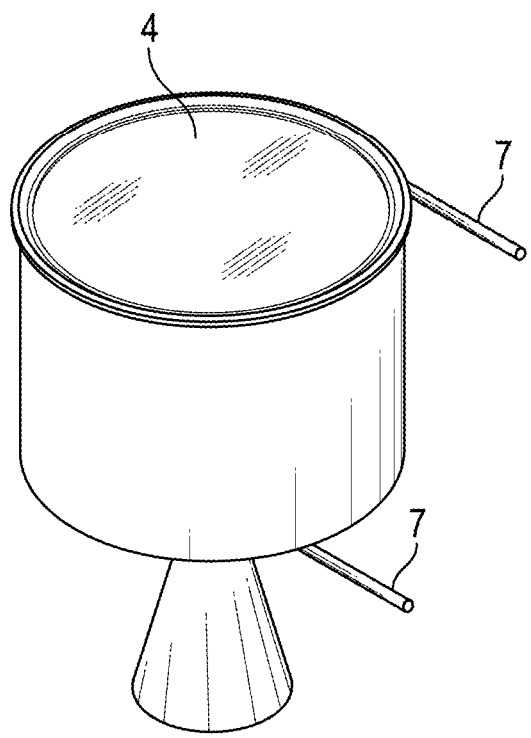
Figure 2E:
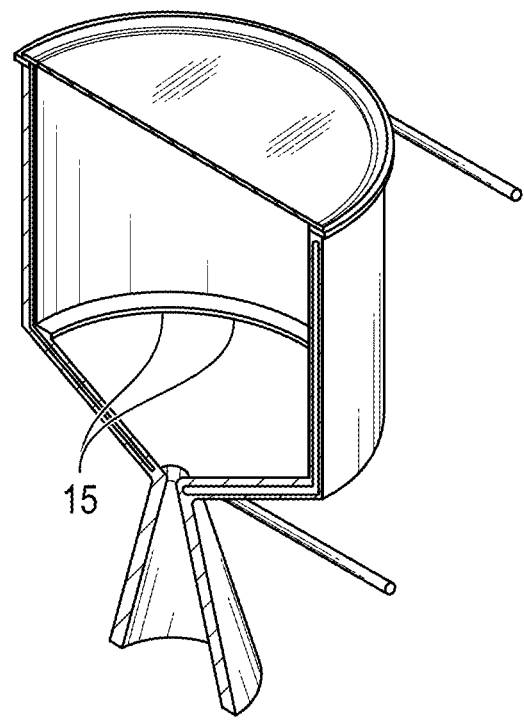
Figure 2F:
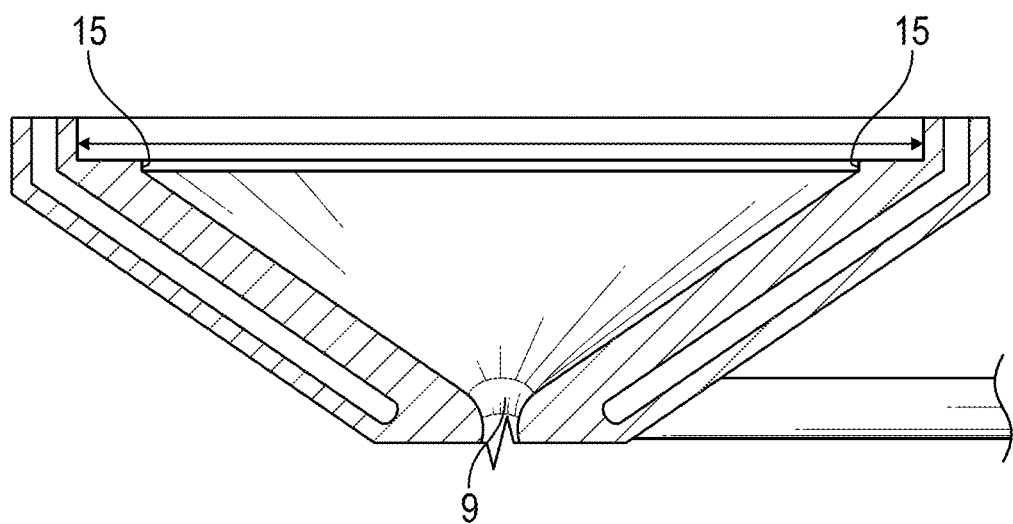
Figure 2G:
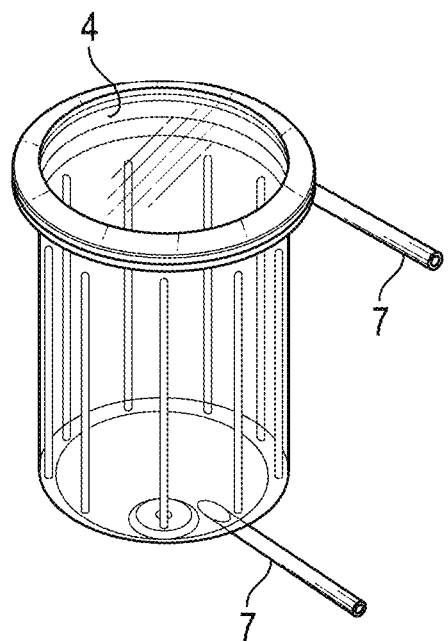
Figure 2H:
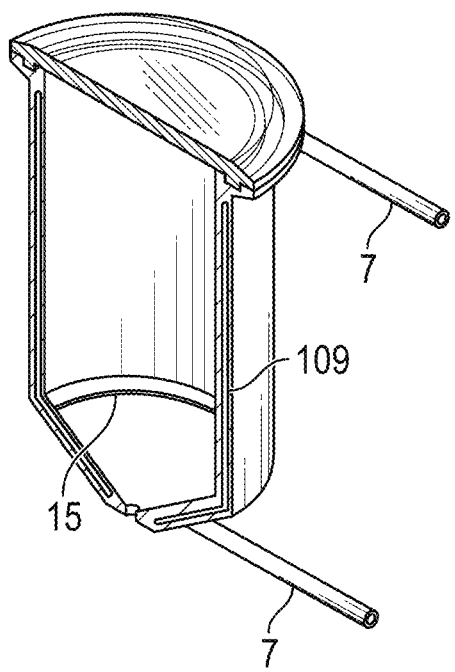

FIGS. 2A-2H show how propellant injection tubes 7 can be oriented tangentially to a generally annular thruster chamber, thereby enhancing swirl of propellant and assisting in uniform propellant distribution. Holes 14 located around the circumference of the chamber can communicate with propellant inlet tubes 7 and allow primary and regeneratively heated propellant to flow into the chamber. A window 4 made of sapphire or other high temperature capable transparent material can be attached with high temperature O-rings, gaskets, c-rings, and/or Marmon clamps, for example. In the thruster chamber, structure (e.g., a step ledge) 15 can be provided to support a solar absorber insert (e.g., one formed from ceramic foam) 121. FIGS. 2F and 2H show a cross-section view of the step ledge 15 and an isometric cutaway of a long chamber design allowing different foam inserts 121 for experimentation. Advantageously, an omnivore thruster can use "contaminated" (or non-pure) propellants having various constituents and use the direct products of optical mining. Although large debris particles (e.g., more than 0.4 mm in diameter-depending on foam cell size), may clog the foam solar coupler and may therefore be filtered out, it is advantageous to not require additional processing, in various embodiments.

Figure 3A:
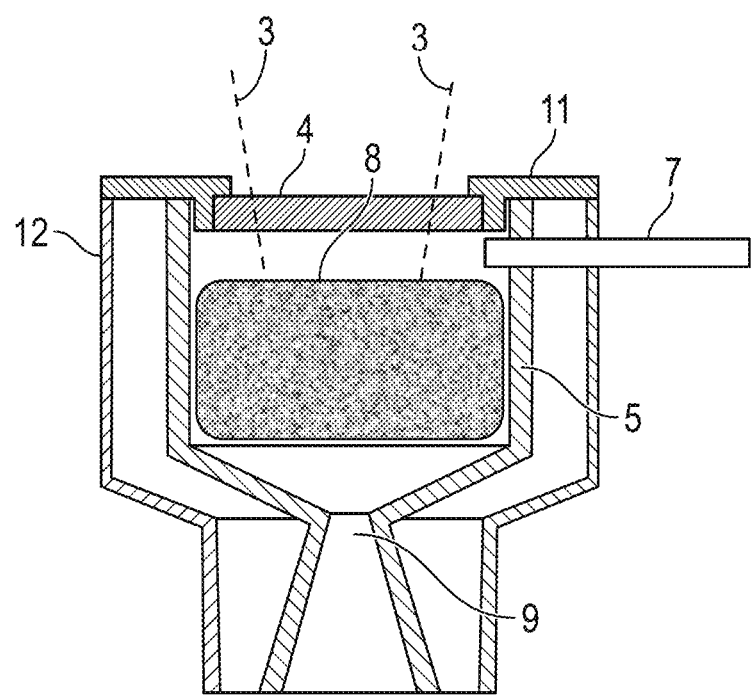
FIG. 3A illustrates a portion of a solar thermal rocket system.

FIG. 3A shows a cross-section view of the solar thermal propulsion chamber 5. The transparent window 4 is captured in a top plate 11 which provides a pressure seal against the internal gas pressure. The propulsion chamber wall 5 is shown with a substantial thickness in cross hatched representation. The wall 5 can be fabricated from a high temperature ceramic material such as Zirconia, for example. The entire rocket nozzle can be contained in a metal jacket 12. In some embodiments, an intervening distance between the jacket 12 and the wall 5 can be open to ambient space. The gas injector channel 7 is shown to penetrate both the metal jacket 12 and the propulsion chamber wall 5.

Figure 3B:
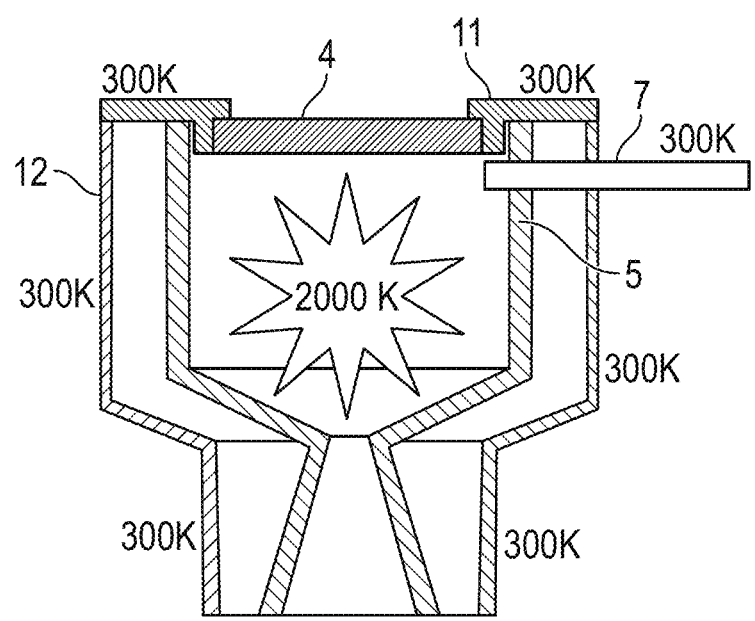
FIG. 3B illustrates thermal gradients within a rocket system.

FIG. 3B shows in simplified detail the temperature gradients in and around the solar thermal thruster. Within the propulsion chamber 5, it can be desirable to keep the gas temperature high. In FIG. 3B, the temperature is shown as about 2000 K, but this is just an example. The outer, generally cylindrical, metal jacket 12 and the top plate 11 can be at nearly room-temperature of approximately 300 K. Such a simple design can present a severe thermal gradient across the Zirconia ceramic in the chamber wall 5. Thus, with this configuration, there may be a relatively high thermal stress across the chamber wall 5, which can result in a high probability of fracture failure.

Figure 4:
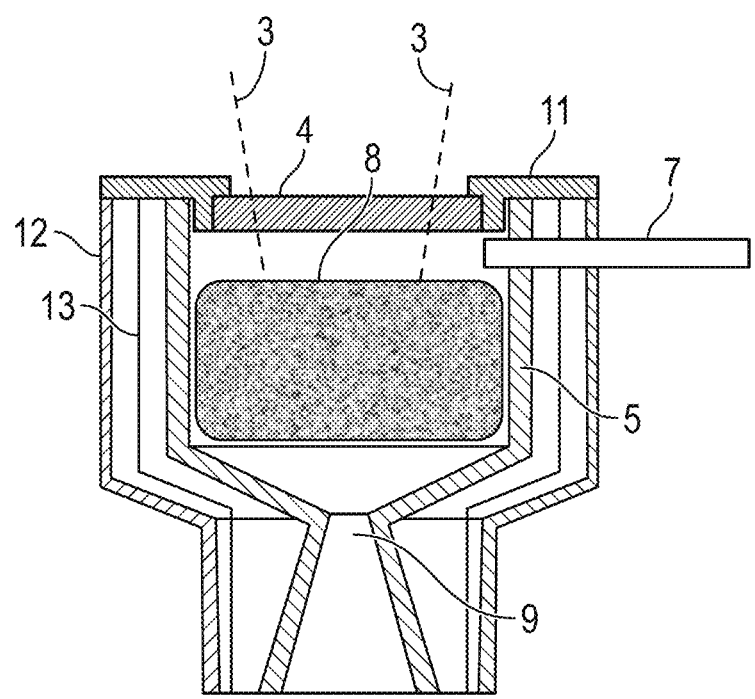
FIG. 4 illustrates thermal shielding for a portion of a rocket.

FIG. 4 shows a design element of aspects of this disclosure that can relieve the potentially damaging thermal stress described in connection with FIG. 3B. An additional shielding feature can be added (for example, a thin cylindrical metal foil 13 as shown in FIG. 4) between the Zirconia ceramic of the propulsion chamber wall 5 and the outer cylindrical metal jacket 12. The foil 13 can serve as a radiation shield. During steady state operation, the foil 13 may come to an intermediate temperature between the propulsion chamber wall 5 and the metal jacket 12. By using the foil 13 as shown in FIG. 4, heat radiation away from the propulsion chamber wall 5 can be substantially reduced. Thermal stresses can be reduced and the internal temperature of the propulsion chamber 5 can be maximized, thereby increasing rocket thrust.

One or more cylindrical foils 13 (or other thermal or radiation barriers) may be added. In some embodiments, they may be similarly spaced apart. When operating in space, the nozzle 9 propels high speed gasses directly into a vacuum. Similarly, the space between the propulsion chamber wall 5 and the outer cylindrical metal jacket 12 can also be open and therefore evacuated to the very low pressure of deep space. Interposing one or more barriers (e.g., foil walls 13) enhances the insulation properties of the vacuum.

Some solar thermal rocket embodiments attempt to reduce or moderate temperature gradients in a propulsion chamber wall 5 by circulating cool propellant gas through channels around the propulsion chamber wall 5. See FIGS. 2A-2E. Aspects of the present disclosure simplify and reduce cost of manufacturing when compared to implementations that circulate cooling propellant gas around the propulsion chamber wall 5. Simpler inlet passages for propellant(s) such as those described herein can also reduce the risk of being clogged by debris.

Further Examples of Rocket Propulsion Systems

Rocket engines can operate on a single propellant or a mixture of propellants. Aspects of this disclosure relate to solar thermal propulsion rocket engines designed to operate in space at variable power and thrust levels and capable of operating with various propellants used singly or in combination simultaneously. The propellants can be stored as either liquid or gaseous fluids.

For spacecraft propulsive applications in Earth orbit, cislunar space, or other orbits, it is advantageous to use readily available solar energy, or sunlight, as the primary power input to the propulsion system. This permits the extraction of propulsive energy from the ambient environment rather than carrying that energy in the form of chemical propellants or via extraction of propulsive energy from an electric power source which could be energized by solar arrays, nuclear energy, or batteries. One advantage of direct solar thermal propulsion is that the energy source need only be a lightweight reflector that concentrates the solar energy onto the thruster or engine. Applications of solar thermal propulsion systems include but are not limited to spacecraft attitude control, station keeping, orbit raising and lowering, orbital plane changes, and more generally transfers to and from asteroids, lunar orbit, and orbits around planets. Solar thermal propulsion systems can be used wherever there is sufficient sunlight, as may be found throughout the inner solar system out to approximately the orbit of Jupiter.

In situ resource utilization (ISRU), is the process of using materials harvested in space to supply space operations. ISRU can be used to enable more pervasive and cost-effective space travel. With ISRU spacecraft propellant may be harvested, manufactured, and stored to provide in-space refueling. Mid-mission refueling reduces launch mass and therefore cost. U.S. Patent Publication No. 2018/0051914 provides example systems and methods for ISRU. ISRU can reduce or eliminate the need to launch propellant from the surface of the Earth to supply space operations. ISRU may therefore allow increased payload transport for the same launch cost.

The solar thermal propulsion systems that utilize propellants collected via ISRU described herein represent an improved and less costly alternative to chemical propulsion systems for near Earth missions and operations within the inner solar system. To fully capitalize on this potential, it is advantageous for such rocket engines to be flexible and "omnivorous" enough to consume whatever propellants are available from in-situ sources, with the same engine being able to operate on different propellants at different times. Aspects of this disclosure are motivated by the desired for propellant flexibility. Likewise, as the spacecraft moves to different locations in space, the intensity of sunlight may vary, and so it may be further advantageous for the solar thermal rocket to be able to change its operating power in accordance with the intensity of sunlight available. Finally, there may be cases in which it is desirable for the thrust level or specific impulse of the rocket to change. Aspects of present disclosure are designed to satisfy one or more of the above-indicated problems for operational flexibility.

The components of a solar thermal propulsion system may include a propellant vaporizer, a solar concentrator, a restricting aperture, and a solar absorber in addition to other elements commonly found in rocket systems. The use of multiple propellant types, variable thrust level, and the ability to operate at variable solar input power levels can involve added functionality as discussed in at least the five example cases below.

First, as is also the case with more typical chemical propulsion systems or rocket engines, the propellant gases in the subsonic pressure chamber may be operated at a greater temperature than the practical working temperatures of the material structure of the rocket engine. Hence, it is desirable to manage the heat load of hot gases in a solar thermal rocket to avoid structural damage to the engine.

Second, it is often desirable to inject the propellant fluid into the pressure chamber in the gaseous phase. To do this, the intrinsic heat-of-vaporization can be supplied prior to injection into the pressure chamber. Furthermore, when liquid phases of propellants are converted to vapor, they can be accompanied by a substantial increase in pressure for a given closed volume. If sudden unsteady phase changes occur in the pressure chamber of a solar thermal rocket engine, the resultant stresses and temperature can spike, particularly during transient operations such as startup and shut down, which may cause failure of structural components or reduce the efficiency of the engine. It is desirable to minimize the deleterious effects of such unsteady operation due to uncontrolled phase changes. Hence, in some embodiments, heat can be applied to first vaporize the liquid into gas prior to injection to at least partially address the unsteady operation. Then, further heat can be applied to increase the gas temperature in the rocket pressure chamber. Increased chamber temperatures may be directly related to increased propulsive specific impulse, which can be a key figure of merit for many space propulsion systems.

Third, it is desirable for rocket engines which are designed to use multiple propellant types in flight to be able to dynamically vary the heat flux to the propellant vaporization process and the mass flow rate into the pressure chamber in order to adapt the propulsive and thermodynamic characteristics in accordance with each propellant type.

Fourth, when focusing solar energy onto the absorber in solar thermal rocket engines, it is desirable to provide additional mechanisms to dynamically adjust the solar heat flux to the engine. In some embodiments, heat flux may be adjusted during transient operations such as startup and shutdown or for the purpose of controlling system thrust and specific impulse during normal operation.

Fifth, effective absorption of solar radiation and heat transfer to the propellant may be important considerations for the overall design of an efficient solar thermal propulsion system. Efficient use of heat can reduce the size of the solar collector needed to collect adequate solar energy and can reduce the size of any required waste heat radiators and can be used to obtain the maximum possible operating fluid temperatures in the engine. Maximum operating temperature is desirable as it increases the maximum possible specific impulse and thrust of the engine.

It is desirable for the omnivore thrusters described herein to be able to work using a wide variety of propellant combinations. Some propellants, such as methane or other hydrocarbons, if used in the omnivore thruster, may deposit materials inside the thruster which over time could degrade the thruster's performance. When hydrocarbons form such deposits in a thruster or rocket engine, the process is generally referred to as coking, but deposits can be caused by a variety of different chemical processes and can involve a variety of different materials. Because a given omnivore thruster can operate on different propellants at different times, the thruster can mitigate the problem of coking or other deposition processes by alternatively using different propellants. These propellants can be selected to remove deposits remaining from previously-used propellants, effectively cleaning the inside of the thruster while simultaneously propelling the thruster. For example, running the thruster using water can have the effect of cleaning any carbon material that might be coked onto the inner surfaces of the thruster due to operation with hydrocarbon propellants. Thus, a control system can be used to select a series of propellants where at least one subsequent propellant can cure or mitigate (e.g., clean) harmful effects (e.g., deposits) from previously used propellants. Alternatively, a combination of propellants can be used to simultaneously clean or prevent deposits. For example, a mixture of deposit-forming propellant and deposit-cleaning propellant can be used to alleviate problems from deposits.

Figure 5:
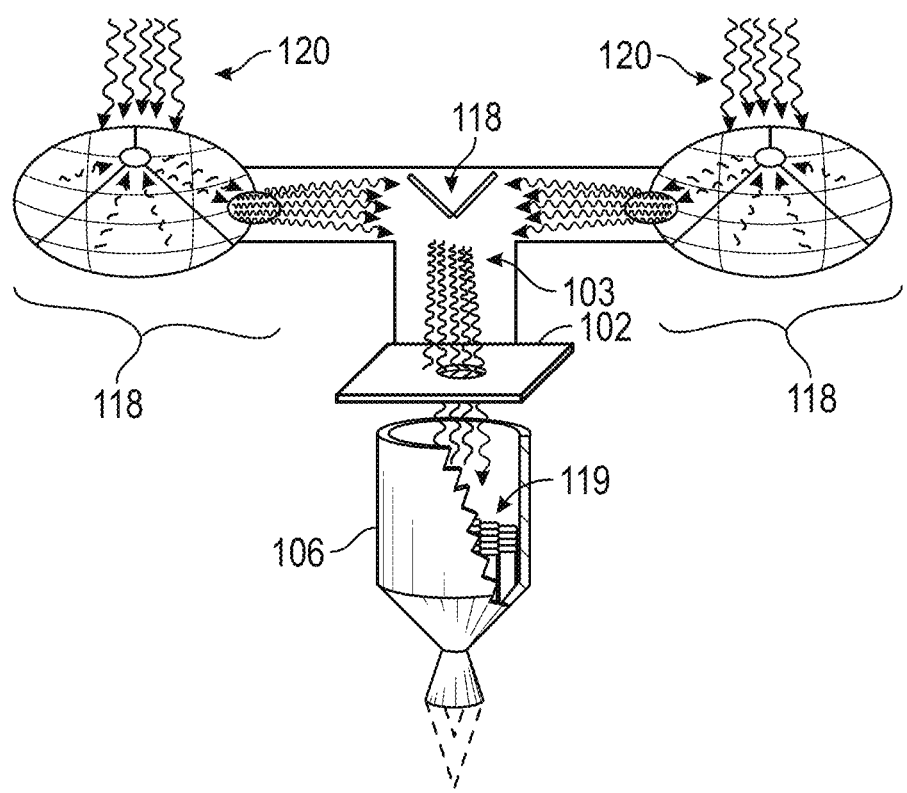
FIG. 5 illustrates a system level overview of a solar thermal thruster during operation.

Further Examples of Solar Thermal Rockets Configured to Use Multiple Propellants FIG. 5 illustrates a solar thermal rocket using mirrored collectors 118 to redirect and concentrate sunlight 120 into a high intensity beam 103. In particular, the solar thermal rocket of FIG. 5 includes the mirrored collectors 118, an optical aperture 102, and a solar thermal thruster 106. The mirrored collectors 118 are configured to direct the light 103 at the solar thermal thruster 106 through the optical aperture 102. The solar thermal thruster 106 includes a solar absorbing medium 119 configured to absorb energy from the light received via the optical aperture 102.

Typical rocket engines employ high energy density within their pressure chambers to create desired flow characteristics and thrust. For example, chemical rocket engines use the potential chemical energy stored in the molecular bonds of rocket fuel to concentrate energy within the combustion chamber.

In the solar thermal rocket of FIG. 5, sun light 120 is collected and concentrated by the one or more reflective surfaces 118 to form the high intensity beam 103. The beam 103 is absorbed in the absorber medium 119 located within the thruster body 106. The absorber 119 is configured to be heated by the beam 103 to a high temperature at which the absorber 119 can transfer heat energy to a surrounding gaseous propellant. By heating the absorber 119 to a sufficiently high temperature, the efficiency of the conversion of the propellant into thrust can be improved.

Figure 6A:
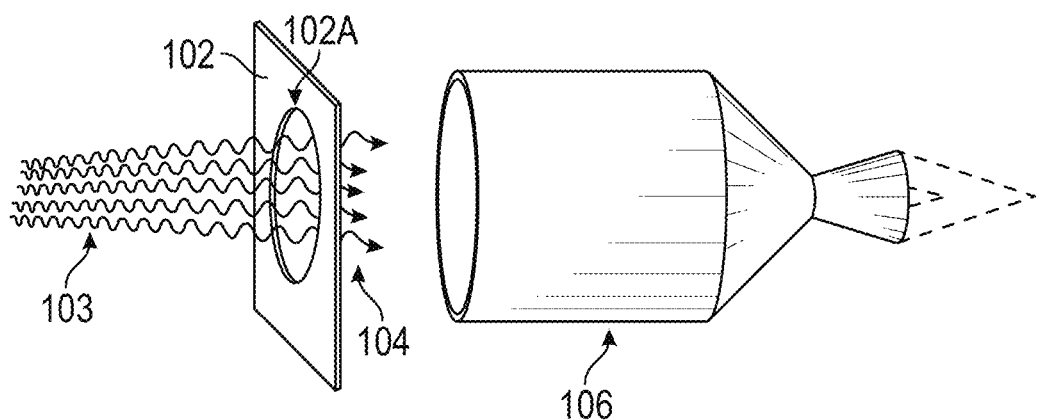
FIGS. 6A and 6B illustrate throttling of a solar thermal thruster using an optical aperture.
Figure 6B:
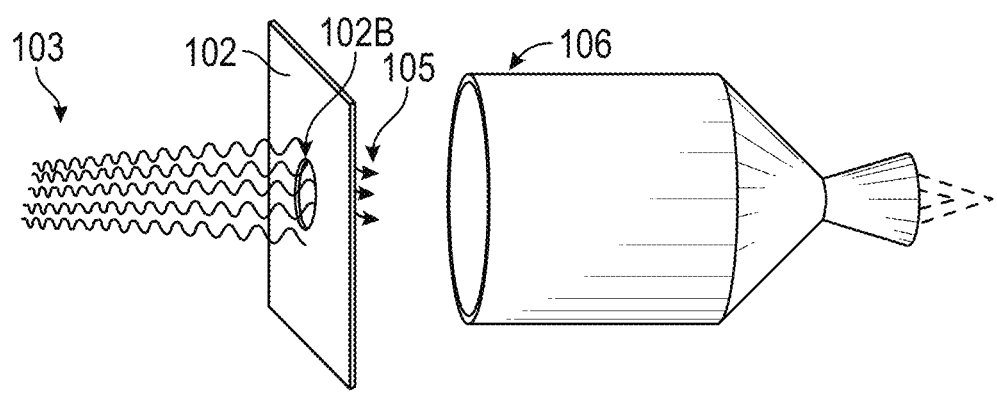

FIGS. 6A and 6B illustrate the use of an optical aperture 102 (which can be adjustable, for example) as an energy control mechanism. In particular, FIG. 6A illustrates the adjustable optical aperture 102 in a larger configuration 102A configured to allow light to pass into the thruster body unobstructed, and FIG. 6B illustrates a smaller configuration 102B for an adjustable optical aperture 102. Compared to 102A, this smaller configuration reduces the amount of light allowed to pass.

The ability to modulate a thruster's 106 input energy is desirable in spacecraft operations. Startup operations use a slowly increasing energy input to prevent damaging pressure or temperature transients, which may damage components of the thruster. When running at nominal power level, it may be desirable to change the type of propellant without shutting down and restarting. In general, each type of propellant may have a characteristic operating temperature and heat of vaporization. Thus, it is desirable to compensate for changes in the energy input to the thruster 106. An adjustable optical aperture 102 can open fully 102A as shown in FIG. 6A for maximum unobstructed power flow 104 or can be constricted 102B to reduce incoming power 105. In some embodiments, the diameter of the adjustable optical aperture 102 can be adjusted to one of a plurality of predefined values, or can be adjusted in a stepless fashion to any desired diameter. As an alternative to, or in addition to, an adjustable optical aperture, a shutter system can be used to control or adjust light or heat. For example, U.S. Provisional Application No. 63/055,231 shows an example hinge and shutter system (e.g., FIG. 6) which is also illustrated in FIG. 6C herein.

Figure 6C:
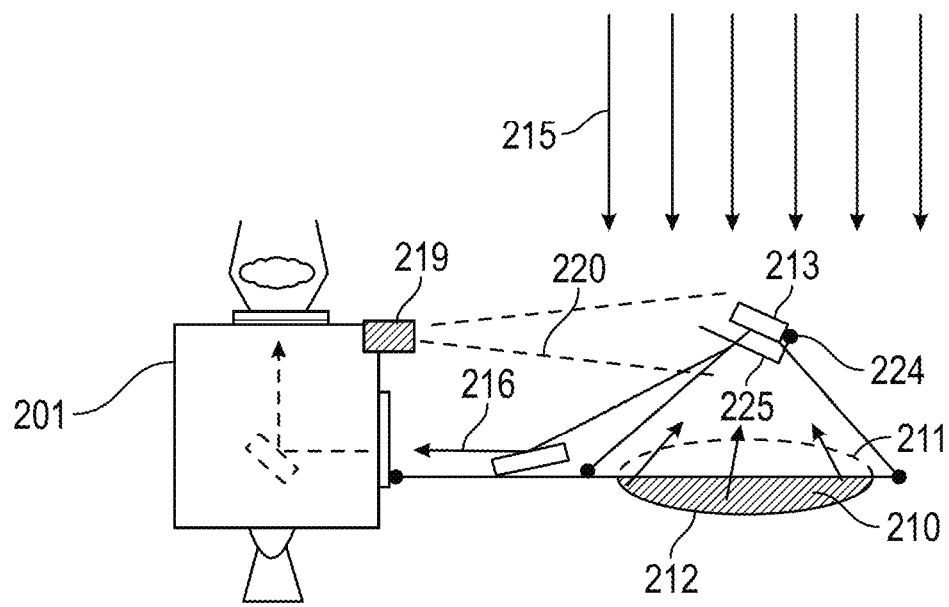
FIG. 6C illustrates a protective hinge and cover plate that can interrupt the formation of an energy beam.

FIG. 6C illustrates a protective hinge and cover plate that can interrupt the formation of an energy beam. Referring to FIG. 6C, a hinge 224 and cover plate 225 are affixed to cover the front surface of reflecting element 213. In this configuration, converging rays from curved reflector 212 are prevented from reflecting and combining to form energy beam 216. Depending on the surface reflectance of cover plate 225, the incident light will be partially absorbed and partially diffusely reflected. The camera 219 will image a diffuse glow upon the surface of cover plate 223. The image position of the glow spot on the surface of the cover plate indicates the accuracy of alignment of curved surface 212 to the incoming solar energy 215 without requiring a reflection from element 213. In this manner, curved surface 212 may be accurately aligned to the direction of the sun before a powerful energy beam is directed further into the spacecraft. Furthermore, the curved surface may be accurately aligned in the direction of the sun without need for a separate sun tracker or sun observing device.

Referring again to FIG. 6C with the cover plate 225 in the blocking position as shown, a significant amount of solar energy 215 can be absorbed by the cover plate 225 thereby causing its temperature to rise. As the plate 225 heats, it will radiate long wavelength thermal energy in all directions. Nearby structures, such as lenticular structure 210 with transparent upper surface 211 will intercept a portion of the radiated thermal energy and also begin to warm. In this manner, lenticular structure 210 and other surfaces can be warmed as needed to prevent moisture or ice build that could potentially degrade its optical performance. Since moisture may be produced during asteroid mining operations, it is desirable to heat optical surfaces as needed.

Figure 7A:
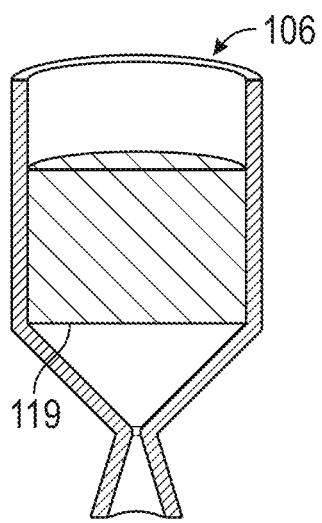
FIGS. 7A-7C illustrate a solar absorber.
Figure 7B:
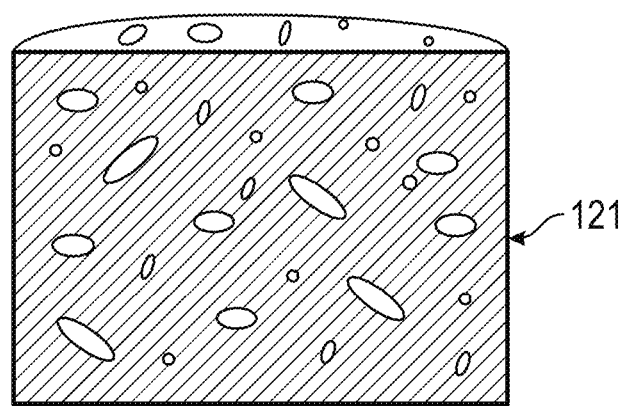
Figure 7C:
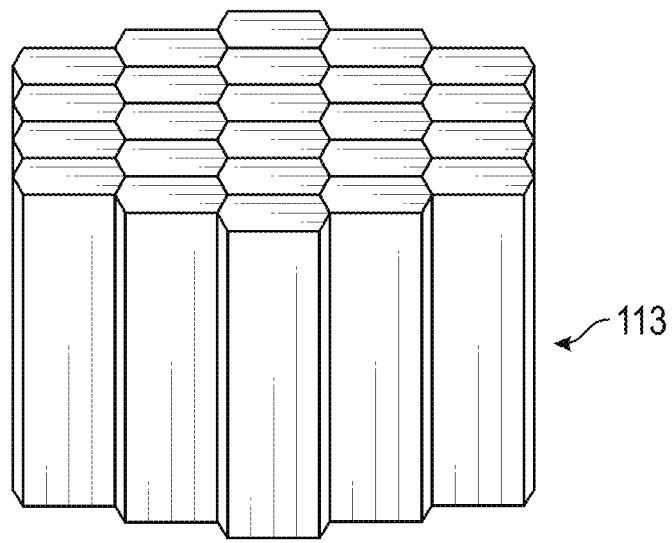

FIGS. 7A-7C illustrate different embodiments of a solar absorber which can be used in the solar thermal thruster 106. For example, FIG. 7A illustrates a cross sectional view of a solar thermal thruster 106 with a solar absorber 119. FIG. 7B illustrates a cross section of ceramic foam solar absorber 121. FIG. 7C illustrates a multi-surface light trapping solar absorber 113, which may be embodied as a honeycomb lattice, a bundle of thin-walled tubes, or a coil of thin sheets.

This disclosure hereby incorporates by reference U.S. Pat. No. 5,138,832A to Pande, which describes a method of absorbing concentrated solar energy in a ceramic open-cell foam-like materials consisting of many small hollow cells.

However, ceramic foam absorbers have several disadvantages compared to some systems disclosed herein. First, the concentrated solar energy tends to be deposited substantially in the surface layers of the foam rather than throughout the bulk volume leading to localized excessive heating. Second, the small cell sizes of ceramic foam absorbers 121 represent considerable mechanical impedance to the flow of heat-exchange fluids (e.g., propellant) and can produce large undesirable pressure drops. Third, the small hollow cell walls of ceramic foam absorbers 121 tend to be fragile when subjected to thermal and mechanical stress resulting in small particle shedding and uncontrolled debris contamination to the downstream rocket nozzle. Fourth, the foam structures of ceramic foam absorbers 121 are fragile and subject to fracture and breakup due to thermal and mechanical stress during operations.

In some embodiments such as that of FIG. 7C, the solar absorber includes a multi-surface light trapping solar absorber 113. In some embodiments, the multi-surface light trapping solar absorber 113 can include a honeycomb structure array of tubes 113 (also referred to as channels). The structure 113 can be fabricated with dimensions configured to allow for more accurate control of energy absorption than the semi-random structure of a foam, such as a ceramic foam absorber 121. The incoming sunlight 103 can be reflected multiple times by the walls of the tubes 113 of the honeycomb structure, where the sunlight 103 is substantially absorbed. Depending on the implementation, the individual tubes of the structure 113 may have different cross-sectional shapes, for example, the tubes 113 may have triangular, rectangular, hexagonal, octagonal, or circular cross-sections.

Devices configured to substantially absorb large amounts of optical power are generally referred to as light traps or beam dumps. The operational principle of these devices is to reflect a beam of incoming light from multiple surfaces at nearly grazing or similar low angles of incidence. Reflections are designed to be specular rather than diffuse to minimize light backscatter in the direction of the incoming light source. Light may be partially or strongly absorbed and partially reflected at each surface. After many reflections, the incoming light is substantially absorbed in total. The multi-surface light trapping solar absorber 113 can be configured to act as a light trap or beam dump in order to absorb substantially all of the received sunlight 103. One advantage to the use of a multi-surface light trapping solar absorber 113 is that heat energy is absorbed over a relatively large absorption area or volume compared to other implementations.

This disclosure hereby incorporates by reference U.S. Pat. No. 5,214,921 to Cooley, which employs a multiple reflection solar energy absorption technique to concentrate solar energy for the purpose of heating both liquid and gaseous fluids. The physical principles of Cooley can be applied to heating propulsion fluids for rocket applications.

For the solar thermal rocket application, it is desirable that the absorbing materials maintain their structural strength at the relatively high temperatures used to achieve peak thrust of the rocket. It is uncommon to find materials suited for this extreme temperature application that also have the preferred high optical absorbing properties. By using light trap embodiments (e.g., by using the multi-surface light trapping solar absorber 113) in the present disclosure, the reflecting surfaces are not required be as strongly absorbing because of the many reflection opportunities. For example, in a light trap configuration (e.g., the multi-surface light trapping solar absorber 113), a material that is a specular reflector with a reflectivity of about 80% corresponding to an absorptivity of about 20% can produce an effective absorptivity for the solar absorber of more than 90%. Thus, aspects of this disclosure are able to use a wider variety of materials for constructing the multi-surface light trapping solar absorber 113, which is a distinct advantage over other systems.

Figure 8A:
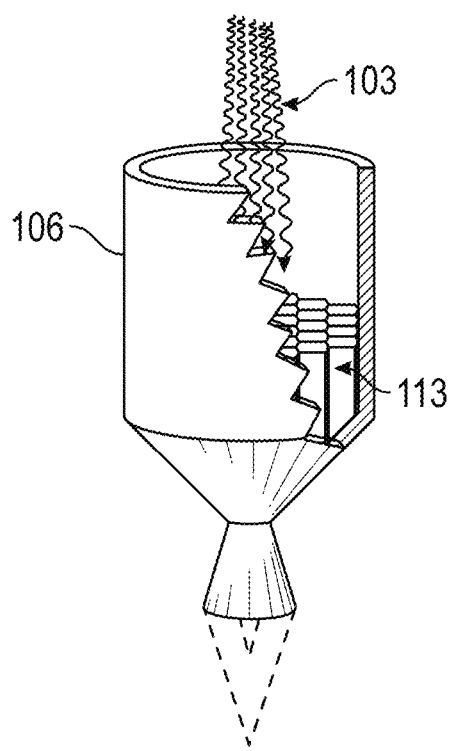
FIGS. 8A and 8B illustrate a solar absorber and incoming light.
Figure 8B:
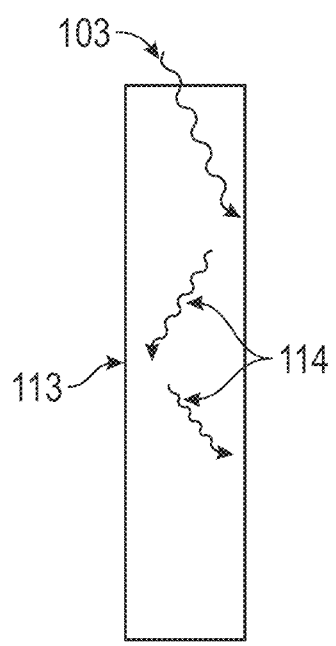

FIG. 8A illustrates a cutaway of an operating thruster 106 with a honeycomb of solar absorber tubes 113. An absorber can be located in all or a portion of a thruster 106. FIG. 8B illustrates the path 114 of light 103 in a single tube 113 as light is absorbed. In particular, a portion of the light 103 may be absorbed and a portion of the light 103 may be reflected as the light 103 travels through the tube 113 along the path 114.

Figure 9A:
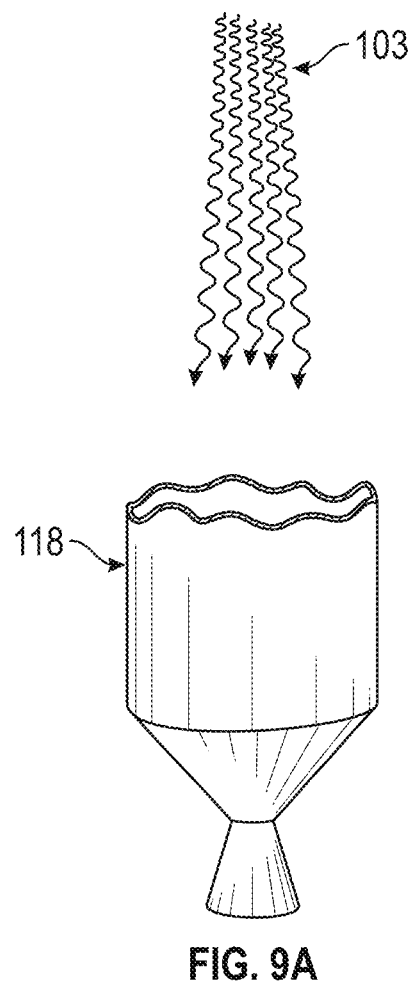
FIGS. 9A and 9B illustrate actively cooling the engine to avoid failure.
Figure 9B:
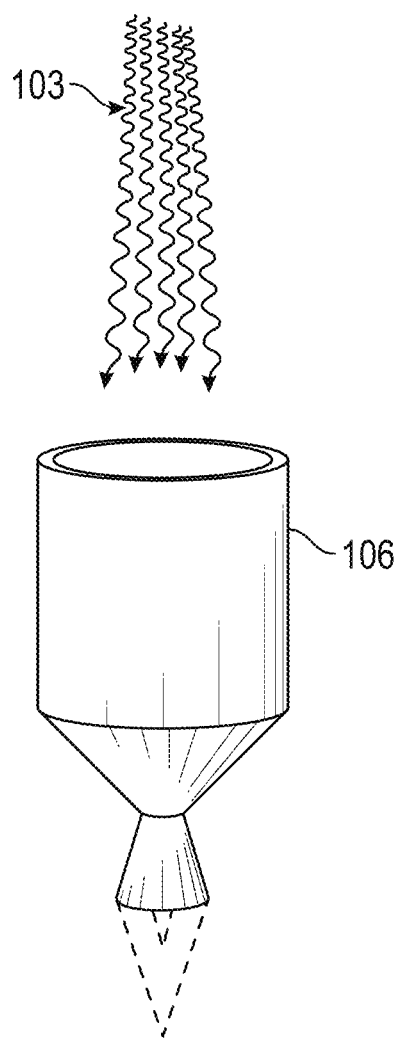

FIGS. 9A and 9B illustrate that cooling the body of a thruster is desirable for efficient long-life operation of a solar thermal rocket. In particular, FIG. 9A illustrates a thruster 118 that has failed due to lack of sufficient cooling, and FIG. 9B illustrates a thruster 106 operating normally with cooling.

Higher temperatures in the pressure chamber of a rocket generally relate to higher rocket specific impulse. One limiting factor on pressure chamber temperatures is the thermal capabilities of available materials. By cooling the walls of the thruster 106 as illustrated in FIG. 9B (e.g., by one of various disclosed mechanisms, including absorption, dispersion, heat transfer, fluid circulation, material diversity, regenerative cooling, etc.), heat can be continuously removed, dispersed, or re-allocated, allowing for higher internal propulsive gas temperature without material failure. Without a cooling mechanism, attempting to operate above safe temperatures may result in overheating and failure 118 as shown in FIG. 9A.

Figure 10:
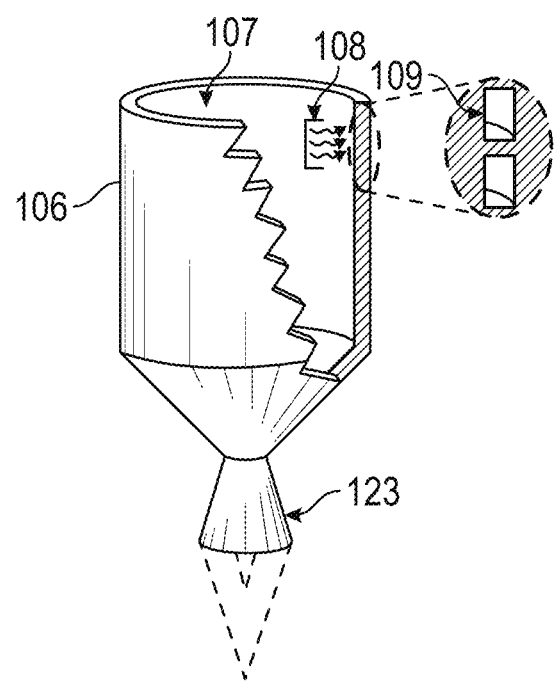
FIG. 10 illustrates channels for vaporizing liquid propellant while regeneratively cooling the material of the thruster.

FIG. 10 demonstrates vaporizing liquid propellant using regenerative cooling. In particular, FIG. 10 illustrates a design of the thruster 106 which enables a liquid propellant to flow through channels 109 (also referred to as vaporizer channels, heating/cooling channels or regenerative channels), where the liquid propellant can absorb energy 108 from the gases in the pressure chamber 107. This energy 108 can cause a phase change of the propellant from liquid to gaseous before injection into the pressure chamber 107. The pressure chamber 107 is also connected to an exhaust cone 123. The exhaust cone 123 may be connected to the pressure chamber 107 along an axial direction of the thruster 106.

It is desirable to vaporize liquid propellant before injection into the pressure chamber 107 to minimize damaging pressure spikes within the chamber which can be caused when liquid droplets suddenly vaporize at high temperature. In the embodiment of FIG. 10, propellant is configured to flow through the cooling channels 109, where the propellant absorbs heat 108 though the walls of the chamber which are heated by the hot gases in the pressure chamber 107 thereby causing a phase change from liquid to gas in the propellant. After traveling through the cooling channels 109, the propellant gas is injected into the pressure chamber 107. The configuration of the pressure chamber 107 can be referred to as an integrated vaporizer.

Channels 109 can be configured to pass through the walls of a thruster 106, for example, the walls of a pressure chamber 107. In some embodiments, such channels can be joined to form a continuous channel, allowing fluid to pass progressively through a series of coils or turns around a chamber 107. The channels can be configured to increase surface area and/or time fluid is in contact with heated side walls, to maximize energy transfer opportunity. The structure of the channels can be configured to engineer flow characteristics—for example speed. Channel design can allow for continuous flow despite potential blocking materials in some portions of a channel. Channels can be formed integrally within side walls to enhance fluid flow (both within the channels and across smooth sidewalls outside the channels. Channels can pass laterally and/or longitudinally, in varying combinations.

Solar thermal heating has several advantages over electrically heated thermal rockets. Solar thermal rockets may use solar radiation to directly heat the heat-transfer surfaces. Electric heating can involve several conversion steps from solar cells to electric power management systems to resistive heating of heat transfer surfaces and is, therefore, relatively less efficient than direct solar thermal.

Although not fully illustrated in FIG. 10, the regenerative channels 109 may have a helical form wound around the surface of the chamber or may be manufactured into the pressure chamber 107 and the exhaust cone 123.

Figure 11A:
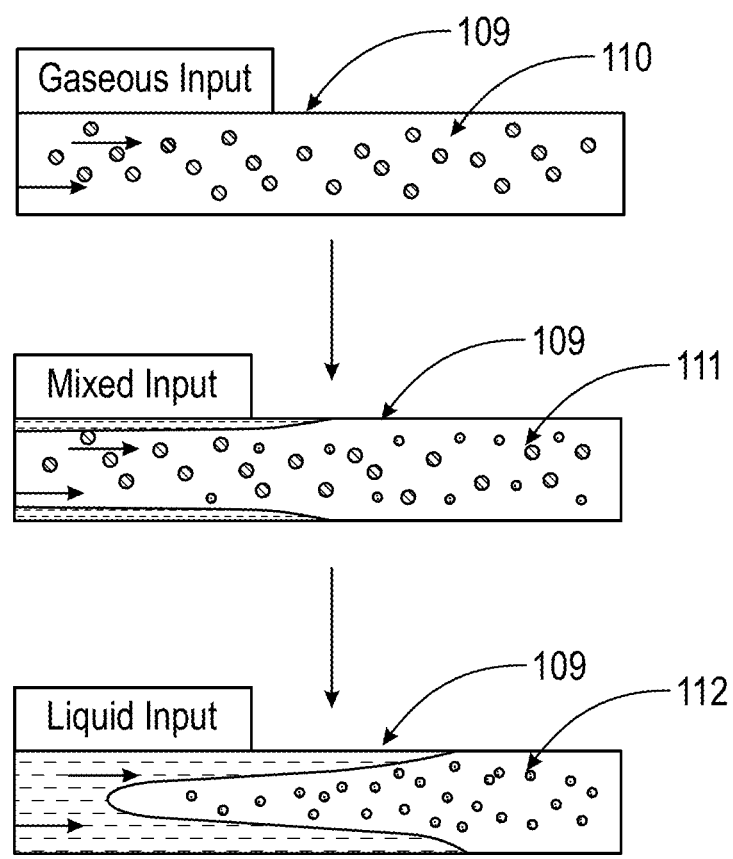
FIGS. 11A and 11B illustrate a regenerative cooling and vaporizing channel (e.g., during a startup sequence).
Figure 11B:
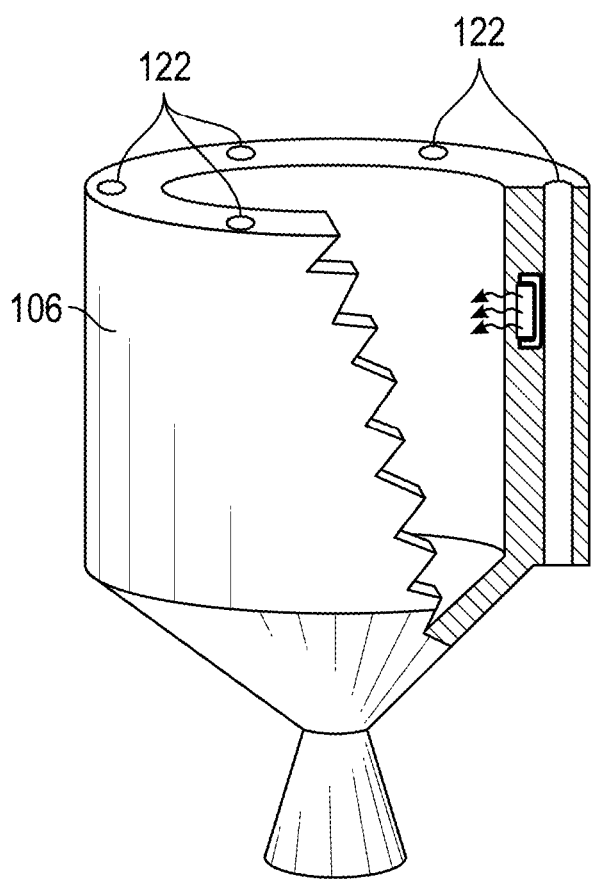

FIGS. 11A and 11B illustrate embodiments of a time sequence representation of the channels 109 during a startup sequence. FIGS. 11A and 11B respectively depict two embodiments of a startup sequence having two stages. In first stage, the thruster is brought to operating temperature. The second phase minimizes transient effects of liquid-to-gas phase change.

In more details, FIG. 11A illustrates a propellant flowing through the channels 109 during a startup sequence which reduces unwanted fluid dynamic transients. The large arrows indicate the passage of time during the transition for startup to normal operations. FIG. 11B illustrates an embodiment of a startup sequence, electric heating elements 122 raise the temperature of the thruster 106 to operating before propellant flow and concentrated sunlight input.

In a system in which fine pressure control is desired, unpredictable transient fluid dynamics are undesirable. In the embodiment of FIG. 11A, the transient effects of liquid-to-gas phase change can be reduced or minimized by beginning with a gaseous propellant 110 at startup. Liquid propellant may be slowly added while reducing gaseous input 111 until the input is fully liquid 112. The rate of change of the input gas-to-liquid ratio can be controlled to keep the system in instantaneous steady state throughout the startup transition to avoid excessive heating of any component of the system during transient operation.

As the thruster 106 can be designed for intermittent use, the thruster 106 will cool during periods of inactivity. This thermal cycling has negative repercussions for all rocket engines. In the case of a solar thermal thruster as disclosed herein, a cold start may present a unique problem when using liquid propellant. In order for the regenerative cooling channels 109 to vaporize the liquid propellant as depicted in FIG. 10, the thruster body 106 may need to be at or near operating temperature. Heating the thruster 106 with concentrated light without flowing propellant can risks thermal damage to one or more components of the thruster 106 because the flowing fluid can be used to maintain thermal equilibrium of the thruster to avoid over heating components.

FIG. 11A shows how the thruster 106 can be brought to operating temperature using concentrated light while a gaseous propellant flows through the vaporizer channels. Thermal damage can be mitigated in this embodiment as the gaseous propellant removes heat, allowing the system to reach thermal equilibrium under operating conditions.

FIG. 11B shows a thruster 106 that includes an electric heater 122 configured to heat the thruster 106 to operating temperature in the absence of propellant flow and concentrated light. A control loop such as a proportional-integral-derivative (PID) loop or other control logic system and accompanying temperature sensors can be used to provide a specific thruster 106 temperature to be reached and maintained during startup.

In the embodiment of FIG. 11B, liquid propellant flow can be gradually increased until reaching operating levels, which may be solely electrically heated. At this time in the startup sequence, the thruster 106 can function as an electro-thermal thruster. Electro-thermal thrusters, generally referred to as resisto-jets, can use electricity to heat propellant and have been a flight proven technology since the 1960s. After thermal and fluid dynamic steady state are reached, the thruster 106 can transition from an electro-thermal mode to solar-thermal thruster mode by simultaneously reducing power to the heating elements 22 and increasing input concentrated light until the thruster 106 is operating solely on light.

As described in FIG. 10, electrically vaporizing liquid propellants for use in a solar thermal rocket may be relatively inefficient. However, the length of the startup sequences described herein may be relatively short compared to the total runtime making any slight inefficiencies acceptable.

Figure 12:
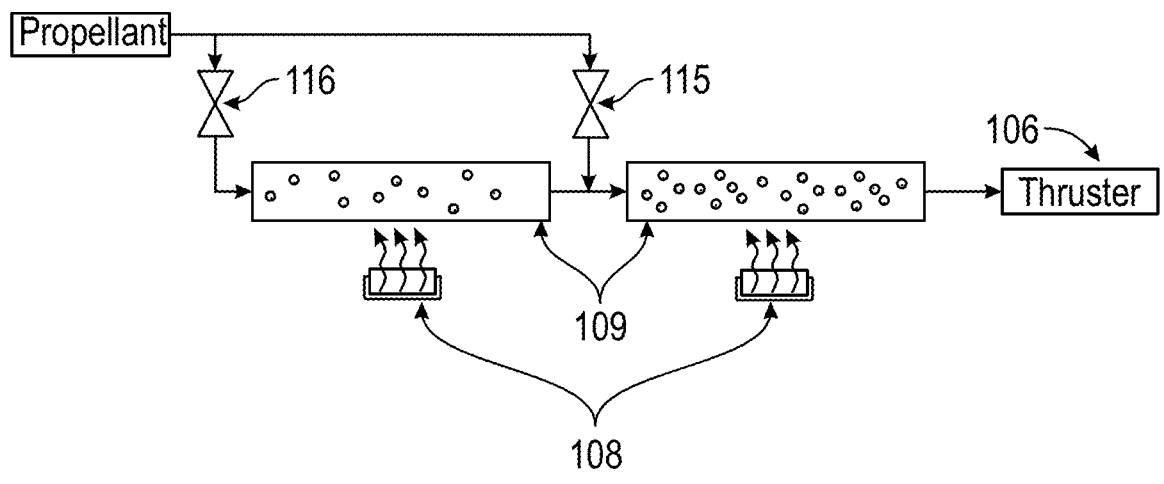
FIG. 12 illustrates a variable geometry channel's ability to modulate propellant temperature.

FIG. 12 illustrates fluid flow resulting in controlled propellant temperatures. In particular, FIG. 12 depicts a method of controlling the temperature of propellant heated by the regenerative cooling channels 109 described herein. It is desirable in a complex system to correlate or match physical variables with controlled degrees of freedom. Variable fluid properties of the propellant which can be controlled, for example, include temperature and mass flow rate. Some fluids, notably water, have a relatively large heat-of-vaporization, while others, such as ammonia have somewhat smaller heat-of-vaporization. For this reason, it would normally not be possible for a regeneratively cooled thruster with channels for vaporizing the propellant to operate using both water or ammonia, for example. However, a thruster can be designed to work on both propellants or differing mixtures of them at different times. This can be accomplished, for example, using variable geometry channels. The flow geometry may be varied through the use of valves 115 and 116. Channels can have a shape that varies over time and/or that varies along a length or other dimension thereof.

FIG. 12 illustrates a plurality of cooling channels 109, an upstream valve 116, a downstream valve 115, and the thruster 106. Additional valves and channels can be used, serially or in parallel (see FIG. 13). The system is configured to modify and control the propellant temperature by injecting (or allowing flow of) a variable proportion of the propellant downstream through the downstream valve 115 with respect to an amount of the propellant that is injected through the upstream valve 116 of the cooling channels 109. Propellant injected upstream (e.g., through valve 116) interacts for a greater time and distance with channel walls, absorbing more energy in the process. Propellant injected downstream (e.g., via the downstream valve 115) has less interaction with the hot channel walls than propellant similarly injected upstream at valve 116, and thus receives less energy 108 from the walls of the cooling channels 109. Increasing flow through downstream valves (e.g., the valve 115)—for example, by opening more of them, or opening them to a larger degree—while simultaneously reducing flow through upstream valves (e.g., the valve 116) can concentrate a thermal transfer (e.g., cooling) effect in an area near the downstream channel 109. This can reduce the overall propellant temperature at the input to the thruster 106, for example.

Figure 13:
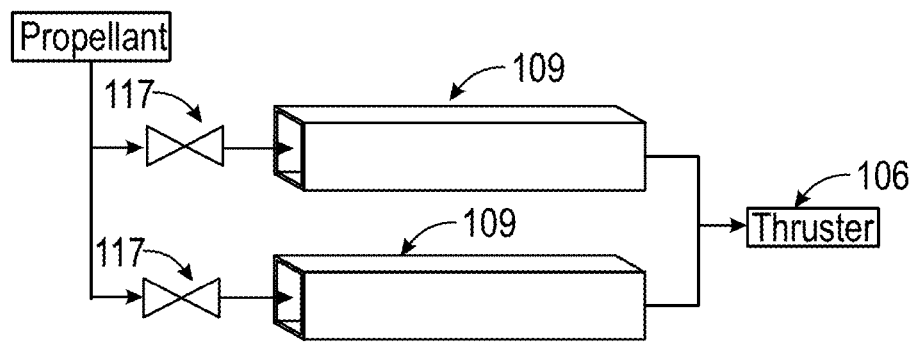
FIG. 13 illustrates a variable geometry channel's ability to change mass flow rate.

FIG. 13 illustrates fluid flow that allows for increased mass flow rates at controlled flow velocity. In particular, FIG. 13 depicts a system including a plurality of metering flow valves 117, a plurality of cooling channels 109, and a thruster 106. The system is configured to control the mass flow rate of propellant through the regenerative cooling channels 109. In this embodiment, multiple channels 109 are placed in parallel. The metering flow valves 117 can be opened or closed in greater or lesser numbers or to greater or lesser degrees and are thereby configured to direct more or less propellant through the flow channels 109 to control the mass flow rate. By using a greater number of channels 109, the system can achieve higher mass flow rates without increasing fluid velocity. It is desirable to control fluid velocity, for example, to control the amount of time the propellant is present in the flow channels 109, and thus, the amount of thermal interaction time (e.g., during which the propellant is heated via contact with walls of the flow channels 109). With excessive velocity the propellant has less time to interact with the hot channel walls causing an undesired decrease thermal energy transfer to the propellant.

The channels described in FIG. 12 and FIG. 13 can have various shapes, lengths, configurations, and cross sections.

They can be independent or intersect. They can have multiple valves and openings, they can be formed from various materials, and they can have consistent or varying cross-sections (within, between, or among them). In some embodiments, a thruster wall can have (e.g., contain or be in thermal contact with) an array of parallel channels with consistent cross sections and length, each having periodic valve openings such that each can form an independent series of channels. Valves can be individual or can be formed by collective structures that interact. For example, a perforated cylinder can have an array of openings leading to channels. A slightly smaller, concentric non-perforated cylindrical sleeve can be configured to nest snuggly against the perforated cylinder and slide along their shared longitudinal axis, thereby allowing fluid to flow through a series of successively revealed openings, for example. Other complimentary structures are also possible, including one cylinder with holes in part of a surface, and a complimentary partial closure cylinder configured to cover all, some, or none of the holes, depending on a twist angle of the closure cylinder. By staggering openings to parallel channels, sliding or twisting such a sleeve or closure structure can progressively and incrementally expose more or less total channel length to cooling fluid flow. Such collective valve structures can provide mechanically elegant and finely tunable cooling capabilities. Valves can be controlled (e.g., actively) or be able to automatically respond to internal thruster conditions due to their structure. A control system can include one or more sensors, one or more processors, and/or one or more actuators (e.g., a drive, motor, gearbox, mechanical links, etc.). Such a control system can be used to evaluate physical conditions and/or decide (or receive decisions for) system changes. For example, a control system can cause valves to open or close to allow use of one or more propellant types and/or states, to control speed or location of a rocket, and/or to account for internal or external conditions or goals. A thruster system can thus be internally or remotely controlled. Some valves can be designed to actively respond to pressures and temperatures without external controls. The same or a similar control system can control other moving parts of a rocket. For example, solar reflectors, collectors, modulators, diffusers, concentrators, etc. can have their angles and surface areas adjusted for better performance. Control systems can share or have redundant sensors, and they can respond collectively. For example, excessive thruster wall heat can be addressed by one or more changes, including valve changes (causing changes to fluid flow), aperture changes (causing changes to solar flux entering a chamber), and/or reflector angle changes (causing changes to solar energy initially collected or relayed).

Embodiments of the described systems can help adjustably cool peripheral structures for any type of rocket engine, including chemical, electrical, nuclear, and solar thermal rocket engines. For example, a rocket engine can include a combustion chamber having a strong peripheral wall, reinforced, thickened, engineered, or otherwise configured to contain propellant and allow for combustion. A converging/diverging rocket nozzle at one end of the combustion chamber can be configured to expel propellant to produce rocket thrust. Energy can be introduced into the combustion chamber through electrical, chemical, nuclear, solar, or other mechanisms. At least one cooling channel can be provided in, adjacent to, or otherwise in thermal contact with a peripheral wall or other structure of the combustion chamber (or other portion of the rocket, such as an exhaust jacket). One or more intermediate openings can be provided in a cooling channel or channels. One or more valves can be provided to allow fluid access at the intermediate (and other) openings of the channel or channels. These valves can be configured to change a deployed length of the at least one cooling channel, thereby adjusting a cooling effect (e.g., within a structure of the rocket engine such as the peripheral wall of the thruster, combustion chamber, exhaust, etc.).

Figure 14:
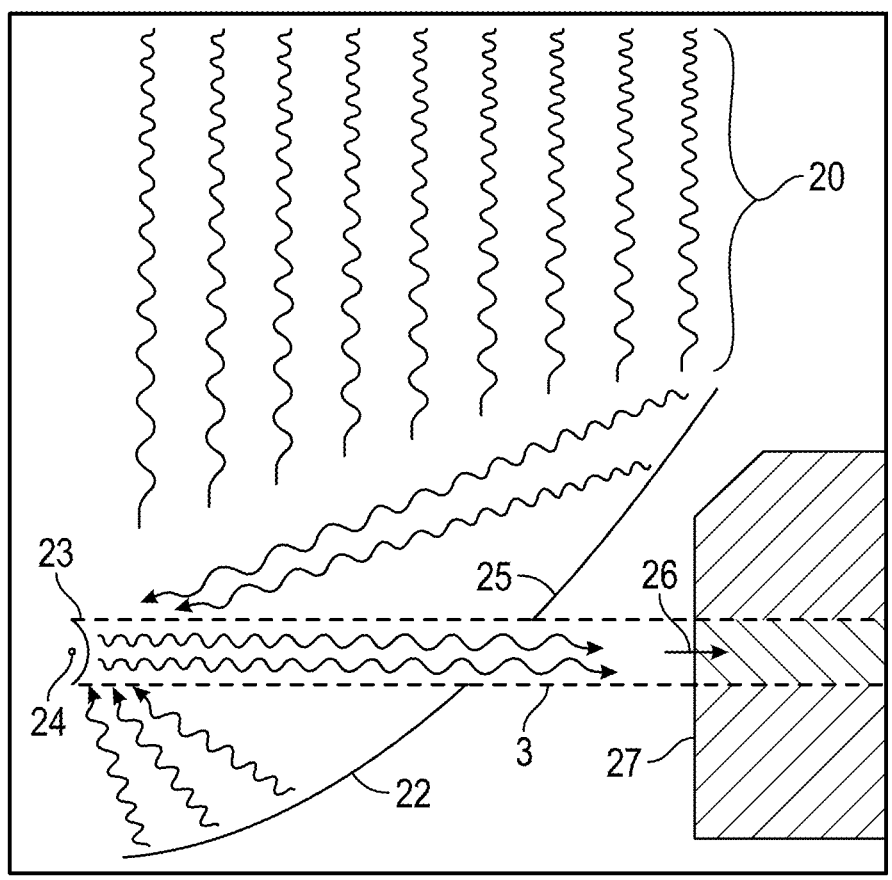
FIG. 14 illustrates an embodiment of an off an outward facing solar collector.

FIG. 14 illustrates an embodiment of an off an outward facing solar collector. In particular, FIG. 14 depicts an off axis concentrating reflector (typically parabolic) 22 and 23 concentrating incoming parallel light 20 into a high intensity beam 3. Light from the sun 20 is focused to point 24 by a primary reflector 22 and collimated by a secondary reflector 23 into a beam 3. The beam passes through an opening 25 in the primary reflector 22 and enters an internal optical assembly 26 in the spacecraft 27 to provide power to other systems.

One aspect of the embodiment of FIG. 14 is that the primary reflector 22 faces away from the spacecraft 27. As such, a hole 25 is formed in the primary reflector to allow the concentrated light 3 to reach the spacecraft 27 in a mass and space efficient architecture. In some embodiments, the primary reflector 22 can follow a parabolic curve with the focus at a point 24. FIG. 14 shows an embodiment in which the reflector 23 and 23 is configured in an off-axis Cassegrain configuration, but on-axis configurations are also possible. As the Sun is not infinitely large and infinitely far away, the light from the sun has a slight divergence (aka finite etendue). To account for this divergence, the secondary reflector 23 can be a segment of a hyperbolic curve with one focus coincident with the focus of the primary reflector at a point 24. The second focus of this hyperbolic curve is located downstream in the collimated beam 3 such that it compensates for the light's divergence.

Benefits of an outward facing primary reflector 22 include safety against pointing errors and a simpler deployment system. As reality lacks perfect parabolas and exact positioning, misalignments are expected. For example, if the spacecraft 27 temporarily loses the ability to point the primary reflector 22 successfully at the Sun and instead points the primary reflector 22 at an angle somewhat away from the Sun, the highly concentrated light 3 from a large reflector could be accidentally directed to hit parts of the spacecraft that would be damaged by the highly concentrated light 3. If the high intensity beam of light 3 were to accidentally hit the spacecraft 27, irreparable damage could occur. By passing the beam 3 back through the hole 25 in the primary reflector 22, damage caused by misalignments are mitigated as stray light is harmlessly reflected off the primary reflector 22 back into space.

Spacecraft 27 often have limited allotted volume in the payload section of launch vehicles. The geometry of an off-axis reflector 22 can be stored during launch more simply and efficiently in the given volume than other embodiments. A simple and efficient storage configuration is reliable and may have less mass, thereby reducing costs. In addition, in an off-axis configuration such as that shown in FIG. 14, practitioners with reasonable skill in the field will understand that the primary reflector 22 is often the largest-mass component of the optical system and it is not positioned far from the spacecraft 27 as in other systems. The close proximity of the primary reflector 22 has a smaller structural moment arm and therefor allows a less massive structural support system. As saving mass is beneficial in spacecraft 27 design, this is desirable.

It is of note that solar concentrators can be used to power solar thermal rocket engines but may also have utility on other applications such as solar thermal power systems and so applications of the present disclosure are not limited to propulsion but also include thermal and power systems of other types.

The diagram of FIG. 14 shows just one primary 22 and one secondary reflector 23. In application a given spacecraft 27 may have multiple primary reflectors 22, each with their own secondary reflector 23 and each primary reflector 22 may have multiple secondary reflectors 23. It is desirable that the primary reflector 22 is directed away from the spacecraft 27 and is located near the spacecraft 27 to afford the aforementioned benefits.

Practitioners with reasonable skill in the field will understand that each of the optical elements in the system describe herein could be comprised of shapes made from ideal mathematical surfaces such as parabolas, ellipses, and/or hyperbolas, or could have shapes determined by numerical optimization using modern ray tracing tools, the effect of which is it optimize the design and improve performance, but may not fundamentally alter the salient features of the design.

Example Aspects of Solar Thermal Rockets

In one aspect, a system of decreasing stress from a thermal gradient in a solar thermal rocket, the system comprises: one or more optical elements configured to collect and concentrate radiant solar energy, focusing the solar energy toward a propulsion chamber; the propulsion chamber configured to contain pressurized propellant gas at a high temperature within a propulsion chamber wall having a thickness; a window configured to admit the concentrated solar energy into the propulsion chamber; a refractory ceramic within the propulsion chamber that is configured to absorb the concentrated solar energy that enters through the window, heat to high temperature, and transfer heat energy to propellant gas flowing adjacent to one or more surfaces of the refractory ceramic; a converging-diverging rocket nozzle configured to expel high speed gas from the propulsion chamber after it has flowed generally through or next to the refractory ceramic, thereby creating rocket thrust; a jacket formed to generally concentrically surround the propulsion chamber and rocket nozzle while allowing propellant to flow unimpeded from the nozzle, the jacket and the window having an outer surface that, in use, has a low temperature that is generally the same as the surrounding space or ambient air; and a heat shield comprising an intermediate concentric layer positioned generally inside the jacket and outside the propulsion chamber and rocket nozzle, the shield configured to have an intermediate temperature between the high temperature and the low temperature, thereby reducing stress on the propulsion chamber resulting from a thermal gradient across the thickness of the propulsion chamber wall.

The refractory ceramic within the propulsion chamber comprise an open-cell ceramic foam configured to permit a propellant gas to flow through the ceramic foam and absorb heat by conduction due to contact with the large internal surface area of the ceramic foam.

The propulsion chamber and converging-diverging rocket nozzle can be fabricated as a continuous hollow cylindrical structure and the propulsion chamber can be fabricated from a refractory ceramic capable of high operating temperatures. In some embodiments, the continuous hollow cylindrical structure and the propulsion chamber can be formed of other materials, such as one or more metals.

The heat shield can be spaced from the propulsion chamber and from the metal jacket by an empty space that is open to ambient such that during space flight it will be evacuated.

Another aspect is a solar thermal rocket engine configured to use singly or in combination simultaneously one or more liquid or gaseous propellant fluids.

The propellant flow rates through the vaporizer (regenerative heating/cooling channels) can be dynamically adjusted to accommodate changes in propellant types while maintaining engine operating temperatures within design limits.

The vaporizer (regenerative heating/cooling channels) can be provided with dynamically adjustable length and cross section area to control and adjust the surface area available for heat transfer to and from propulsion fluids. In some cases, sections of the channels can be bypassed in for use with propellants that are more easily vaporized. The bypass can be accomplished with valves that direct the propellant through tube lengths that circumvent more circuitous channels.

The vaporizer channels of fixed length can be provided with multiple inlet ports along the length of the channel and multiple inlet valves for injecting propellant fluids into adjustable lengths of channel.

The multiple parallel vaporizer channels of fixed length can be each provided with inlet valves to independently adjust the flow of propulsion fluids through a multiplicity of channels.

The valves can be used to admit various propellant fluids singly or in combination into heat exchangers and to adjust their flows to accommodate changing thermodynamic requirements and to control pressure instabilities during different phases of rocket operations including startup, shutdown, and continuous operation at variable thrust levels.

The adjustable regenerative channels can have a helical form (e.g., wound around the surface of or manufactured into the pressure chamber and exhaust cone of a rocket engine) or of axial form (e.g., bonded along the length of or manufactured into the rocket engine). Multiple form can be combined to allow for greater flexibility and variation, for example, depending on which channels are opened for use.

The collected solar energy can be concentrated and focused through a transparent pressure-resistant window into a solar absorbing structure. This can comprise multiple surfaces that interact with energy. For example, it can comprise a labyrinthine assembly of multiple partially reflecting, partially transmitting, and partially absorbing surfaces where solar radiant energy is converted to thermal heat energy in the absorbing surfaces. The assembly can further contain pressurized propulsion gas in the spaces between absorbing surfaces, such that thermal heat is transferred to the propulsion gas by both thermal radiation and by direct gaseous fluid conduction from the absorbing surfaces.

The pressurized and heated propulsion gas can be expelled through a converging/diverging rocket nozzle to produce rocket thrust.

The assembly of surfaces can be constructed from metallic alloys and/or ceramics, for example.

The engine can have an assembly of surfaces that comprises reflecting and absorbing passages of triangular, rectangular, hexagonal, or circular cross-sections.

The engine can further comprise a solar flux modulating device. For example, this device can be an optical aperture of adjustable opening area that is disposed between a solar collector and a solar absorber for the purpose of dynamically adjusting the total thermal power input to the rocket engine. A coating, shutter or shield feature can also or alternatively be used to adjust solar flux or alter a balance between reflection, absorption, and transmission (see FIG. 6C, for example).

The engine can maintain a store of a cleaning propellant and can be configured to use the cleaning propellant periodically during operation to clean the inside surface of the engine and remove deposits made through the operation of the engine when using propellants that leave such deposits behind including carbon depots left behind by coking, the engine configured to operate with different combinations of depositing propellants and cleaning propellants.

Yet another aspect is a rocket engine system comprising: a first propellant container configured to hold deposit forming propellant; a second propellant container configured to hold deposit cleaning propellant; a passage connected to both the first and second propellant containers; a manifold in fluid communication with the passage and configured to select or combine propellant from the containers; and a cleaning control system configured to control the manifold, thereby using the two propellants in combination to reduce deposits within the rocket engine system.

The rocket engine can further comprise: a third container configured to hold cooling fluid; a passage configured to direct cooling fluid through structural elements of the rocket engine; and a cooling control system configured to control the flow of the cooling fluid, thereby at least periodically cooling to maintain structural integrity of the rocket engine.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of starting up a solar thermal rocket engine, comprising:
   providing a gaseous propellant to the solar thermal rocket engine via one or more propellant channels;
   introducing a liquid propellant to the solar thermal rocket engine via the one or more propellant channels; and
   gradually reducing a gas-to-liquid propellant ratio provided to the solar thermal rocket engine via the one or more propellant channels to ensure that the solar thermal rocket engine is maintained in an instantaneous steady state.

2. The method of claim 1, wherein the gas-to-liquid ratio is reduced until the gaseous propellant is no longer provided to the solar thermal rocket engine.

3. The method of claim 1, further comprising:
   raising a temperature of the solar thermal rocket engine using an electric heater before providing the gaseous propellant to the solar thermal rocket engine.

4. The method of claim 3, further comprising:
   heating absorbing materials of the solar thermal rocket engine using solar energy in response to the temperature of the solar thermal rocket engine reaching an operating temperature.

5. The method of claim 3, wherein the solar thermal rocket engine comprises a control loop and a temperature sensor, wherein the control loop is configured to control the electric heater based on an output of the temperature sensor.

6. The method of claim 1, wherein a rate of change of the gas-to-liquid propellant ratio is maintained below a threshold level to prevent components of the solar thermal rocket engine from rising above a threshold temperature as the gas-to-liquid propellant ratio is gradually reduced.

7. The method of claim 1, further comprising:
   transitioning the solar thermal rocket engine from an electro-thermal thruster mode to a solar-thermal thruster mode in response to reaching a thermal and fluid dynamic steady state within the solar thermal rocket engine.

8. The method of claim 1, wherein transitioning the solar thermal rocket engine from the electro-thermal thruster mode to the solar-thermal thruster mode comprises reducing power to an electric heating element and increasing concentrated light input into the solar thermal rocket engine.

9. A solar thermal rocket, comprising:
a solar thermal rocket engine;
one or more propellant channels, the solar thermal rocket configured to:
provide a gaseous propellant to the solar thermal rocket engine via the one or more propellant channels,
introduce a liquid propellant to the solar thermal rocket engine via the one or more propellant channels; and
gradually reduce a gas-to-liquid propellant ratio provided to the solar thermal rocket engine via the one or more propellant channels to ensure that the solar thermal rocket engine is maintained in an instantaneous steady state.

10. The solar thermal rocket of claim 9, wherein the gas-to-liquid ratio is reduced until the gaseous propellant is no longer provided to the solar thermal rocket engine.

11. The solar thermal rocket of claim 9, further comprising:
an electric heater configured to raise a temperature of the solar thermal rocket engine before providing the gaseous propellant to the solar thermal rocket engine.

12. The solar thermal rocket of claim 11, wherein the solar thermal rocket engine comprises absorbing materials, the solar thermal rocket further configured to:
heat the absorbing materials of the solar thermal rocket engine using solar energy in response to the temperature of the solar thermal rocket engine reaching an operating temperature.

13. The solar thermal rocket of claim 11, wherein the solar thermal rocket engine comprises a control loop and a temperature sensor, wherein the control loop is configured to control the electric heater based on an output of the temperature sensor.

14. The solar thermal rocket of claim 9, wherein a rate of change of the gas-to-liquid propellant ratio is maintained below a threshold level to prevent components of the solar thermal rocket engine from rising above a threshold temperature as the gas-to-liquid propellant ratio is gradually reduced.

15. The solar thermal rocket of claim 9, wherein the solar thermal rocket is further configured to:
transition the solar thermal rocket engine from an electro-thermal thruster mode to a solar-thermal thruster mode in response to reaching a thermal and fluid dynamic steady state within the solar thermal rocket engine.

16. The solar thermal rocket of claim 9, wherein transitioning the solar thermal rocket engine from the electro-thermal thruster mode to the solar-thermal thruster mode comprises reducing power to an electric heating element and increasing concentrated light input into the solar thermal rocket engine.

* * * * *